US012680453B1

(12) United States Patent
Vitt et al.

(10) Patent No.: US 12,680,453 B1
(45) Date of Patent: Jul. 14, 2026

(54) FUEL VAPORIZATION POWER TURBINE ENGINE, METHOD OF ASSEMBLY AND METHOD OF USE

(71) Applicant: General Electric Company, Evendale, OH (US)

(72) Inventors: Paul Hadley Vitt, Liberty Township, OH (US); Jeffrey D. Clements, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/293,547

(22) Filed: Aug. 7, 2025

(51) Int. Cl.
| | |
|---|---|
| *F01D 1/26* | (2006.01) |
| *F01D 15/12* | (2006.01) |
| *F02C 7/224* | (2006.01) |

(52) U.S. Cl.
CPC .............. *F01D 1/26* (2013.01); *F01D 15/12* (2013.01); *F02C 7/224* (2013.01); *F05D 2200/11* (2013.01); *F05D 2200/12* (2013.01); *F05D 2200/13* (2013.01); *F05D 2200/14* (2013.01); *F05D 2200/221* (2013.01); *F05D 2200/33* (2013.01); *F05D 2220/323* (2013.01); *F05D 2240/24* (2013.01); *F05D 2260/20* (2013.01)

(58) Field of Classification Search
CPC ...... F01D 15/12; F02C 7/224; F05D 2200/11; F05D 2200/12; F05D 2200/13; F05D 2200/14; F05D 2200/33; F05D 2200/221; F05D 2200/323; F05D 2240/24; F05D 2260/20
See application file for complete search history.

(56) References Cited

U.S. PATENT DOCUMENTS

| | | | | | |
|---|---|---|---|---|---|
| 4,592,204 | A | * | 6/1986 | Rice .......................... | F02C 7/16 |
| | | | | | 60/39.17 |
| 5,010,729 | A | | 4/1991 | Adamson | |
| 5,054,279 | A | * | 10/1991 | Hines .................... | F01K 21/047 |
| | | | | | 60/39.5 |
| 6,012,279 | A | * | 1/2000 | Hines .................... | F02C 7/1435 |
| | | | | | 60/39.53 |

(Continued)

OTHER PUBLICATIONS

Wendus, et al. "Follow-On Technology Requirement Study for Advanced Subsonic Transport," NASA/CR-2003-212467 (Year: 2003).*

(Continued)

*Primary Examiner* — David P. Olynick
(74) *Attorney, Agent, or Firm* — Carter, DeLuca & Farrell, LLP

(57) ABSTRACT

Some embodiments provide engines comprising: a fuel line; a gas combustion system; a first power turbine positioned within an exhaust gas stream and configured to operate at a first rotation speed; a second power turbine downstream from the first power turbine, and configured to operate at a second rotation speed that is less than the first rotation speed; and a heat exchanger configured to receive the exhaust gas stream, wherein a portion of a fuel line is positioned to receive heat from the heat exchanger configured to heat the fuel; a gear ratio (GR) is defined by a ratio of the second rotation speed to the first rotation speed; a combination of the first power turbine and the second power turbine includes a number of blade rows (NBR); and a system effectiveness control (SEC) is established as a function of the GR and the NBR.

20 Claims, 12 Drawing Sheets

(56)                References Cited

U.S. PATENT DOCUMENTS

| | | | | |
|---|---|---|---|---|
| 6,470,668 | B2 * | 10/2002 | Payling | F04D 29/705 |
| | | | | 60/39.3 |
| 6,484,508 | B2 * | 11/2002 | Rocklin | F02C 9/48 |
| | | | | 60/775 |
| 6,553,753 | B1 * | 4/2003 | Payling | F01K 21/047 |
| | | | | 60/785 |
| 6,732,502 | B2 | 5/2004 | Seda | |
| 11,391,211 | B2 | 7/2022 | Smith | |
| 11,448,130 | B2 | 9/2022 | Ribarov | |
| 11,718,410 | B2 | 8/2023 | Clarke | |
| 11,795,878 | B2 | 10/2023 | Hinderliter | |
| 11,946,415 | B2 | 4/2024 | Rambo et al. | |
| 2002/0189231 | A1 * | 12/2002 | Franchet | F02C 3/113 |
| | | | | 60/226.1 |
| 2013/0192258 | A1 * | 8/2013 | Kupratis | F02C 3/113 |
| | | | | 60/801 |
| 2016/0149469 | A1 * | 5/2016 | Lemmers | F01D 25/12 |
| | | | | 290/1 A |
| 2017/0234159 | A1 * | 8/2017 | Schwarz | F02C 3/107 |
| | | | | 417/405 |
| 2021/0108570 | A1 * | 4/2021 | Bemment | F02C 3/113 |
| 2021/0340908 | A1 * | 11/2021 | Boucher | F02C 7/224 |
| 2022/0099025 | A1 * | 3/2022 | Carrotte | F02C 9/26 |
| 2022/0364513 | A1 | 11/2022 | Muldoon | |
| 2023/0010158 | A1 * | 1/2023 | Muldoon | B64D 37/30 |
| 2023/0304439 | A1 | 9/2023 | Holley | |
| 2023/0340906 | A1 | 10/2023 | Vitt | |

OTHER PUBLICATIONS

Waters, et al. "Analysis of Turbofan Propuision System Weight and Dimensions," NASA TM X- 73, 199, January J 977. (Year: 1977).*
Halliwell, et al., "Fuel Burn Benefits of a Variable-Pitch Geared Fan Engine," Aug. 2012. (Year: 2012).*

* cited by examiner

Deliver a fuel to a gas combustion system

1204

Operate a first power turbine at a first rotation speed

1206

Operate a second power turbine at a second rotation speed that is less than the first rotation speed

1208

Heat the fuel within a portion of the fuel line from convected heat from a heat exchanger positioned to receive at least a portion of the exhaust gas stream

FUEL VAPORIZATION POWER TURBINE ENGINE, METHOD OF ASSEMBLY AND METHOD OF USE

FIELD

The present disclosure relates generally to engines and, more particularly, to aviation engines.

BACKGROUND

In one form, aviation engines can include one or more fan and core configurations arranged in flow communication with one another. The core generally includes, in serial flow order, a compressor section, a combustion section, a turbine section, and an exhaust section.

In operation, air is provided from the fan to an inlet of the compressor section where one or more axial compressors progressively compress the air until it reaches the combustion section. Fuel is mixed with the compressed air within the combustion section and burned to provide combustion gases. The combustion gases are routed from the combustion section to the turbine section. The flow of combustion gasses through the turbine section drives the turbine section and is then routed through the exhaust section to atmosphere.

BRIEF DESCRIPTION OF DRAWINGS

A full and enabling disclosure of the present disclosure, including the best mode thereof, directed to one of ordinary skill in the art, is set forth in the specification, with reference to the appended figures, in which:

FIG. 10 illustrates a simplified cross-sectional half-view of the example portion of an example forward shaft engine with a power turbine stage, in accordance with some embodiments;

Figure 1:
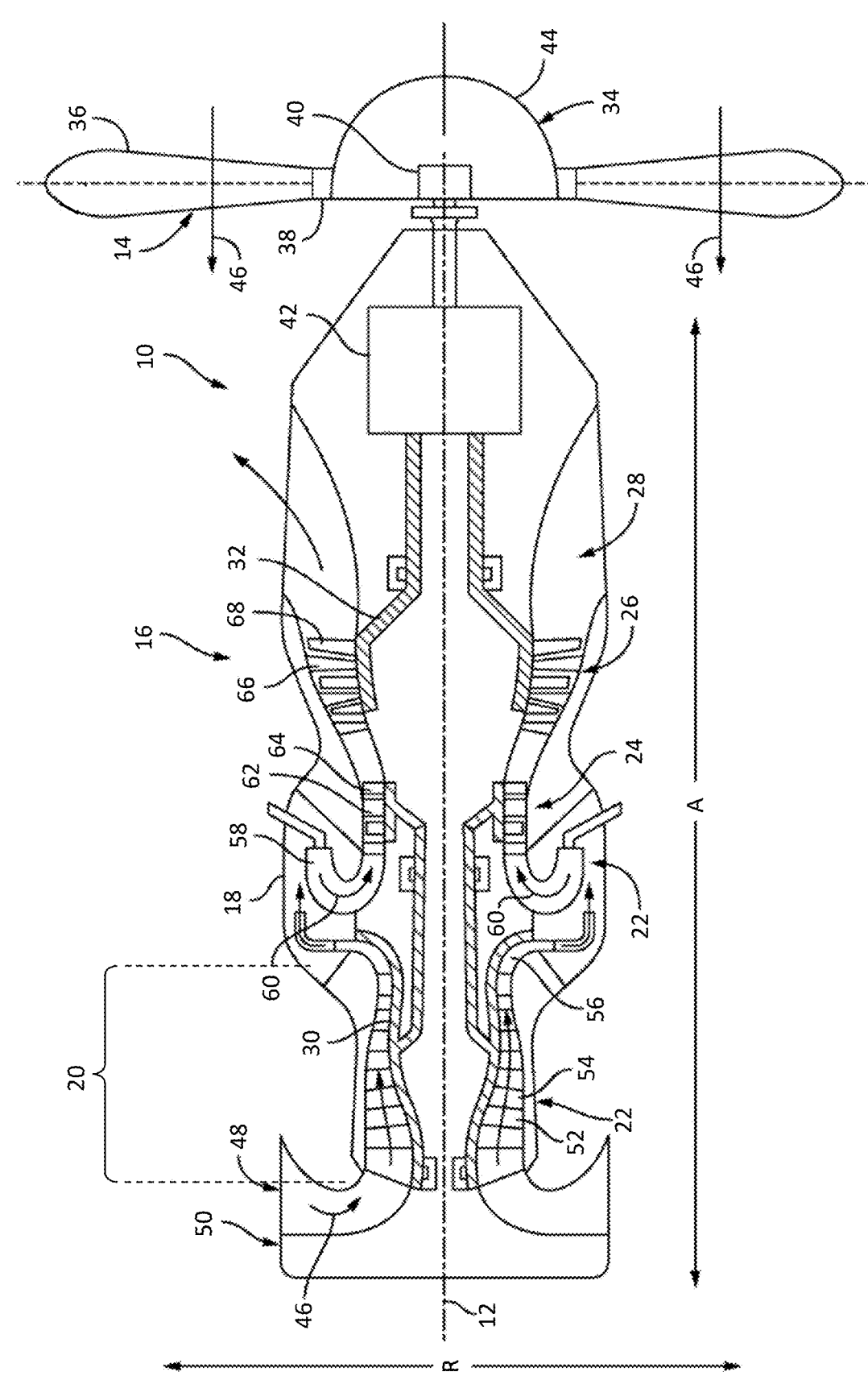
FIG. 1 is a schematic cross-sectional view of an example turbine engine in accordance with an exemplary embodiment of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of variations of the present disclosure. Also, common but well-understood elements that are useful or necessary in a commercially feasible embodiment are often not depicted in order to facilitate a less obstructed view of these variations of the present disclosure. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure. The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present disclosure. Thus, appearances of the phrases "in one embodiment," "in an embodiment," "in some embodiments", "in some implementations", and similar language throughout this specification may, but do not necessarily, all refer to the same embodiment.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "turbine engine" refers to an engine having a turbomachine as all or a portion of its power source. Example turbine engines include turbofan engines, turboprop engines, turbojet engines, turboshaft engines, etc., as well as hybrid-electric versions of one or more of these engines.

The term "combustion section" and "combustion system" refer to any heat addition system for a turbomachine. For example, the term combustion system may refer to a system or section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high," or their respective comparative degrees (e.g.,-er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a turbine engine or vehicle, and are based on a normal operational attitude of the turbine engine or vehicle. More particularly, forward and aft are used herein with reference to a direction of travel of the vehicle and a direction of propulsive thrust of the turbine engine.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The terms "coupled," "fixed," "attached to," "cooperated," "fluidly cooperated" and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

Aspects of the present disclosure generally relate to engine designs that provide in part an improved heat transfer for one or more uses, such as heating a fuel to be supplied for combustion within the engine. Further, embodiments have been designed to achieve desired heat transfer while providing more compact and/or reduced length that prior systems.

The inventors found that in some engines, a rate of flow of an exhaust gas stream can adversely affect heat transfer that can be used to heat other aspects of engine operations, such as, but not limited to, heating of the fuel. Some engines attempt to utilize long diffusers aft of turbines, but this results in longer engine designs, unnecessary cost to the engine design without appreciable benefit, and also adds unnecessary weight to an aircraft, thereby reducing overall fuel efficiency (e.g., due to increased fuel burn). Some fuels, such as cryogenic fuel systems (e.g., H2), utilize a heat source for vaporization of the fuel. Power turbines of some engines often have high rotational speed (e.g., for efficiency) and the annulus height is limited due to mechanical limitations on the blades, which results in relatively high exhaust Mach numbers that limit an ability to effectively provide heat exchange from the exhaust gas stream (e.g., loss=f($M^2$), where M is the Mach number). Therefore, there is a need for an engine design that improves heat transfer for one or more uses, such as heating a fuel to be supplied for combustion within the engine.

Designing components for an engine is generally a complex, very labor intensive and time-consuming process that involves careful consideration of the interrelated factors that influence engine operation and performance. The inventors set out to design an engine that operates to address the issues that are noted here. Through repeated, iterative design, experimentation, testing performance characteristics for each design, and redesigning based on results, the inventors developed certain embodiments (described in the detailed description section below) that reduced the exhaust gas Mach number to improve heat exchange efficiency, such as to heat a fuel, without undue engine performance tradeoffs.

Reference will now be made in detail to embodiments of the disclosure, one or more examples of which are illustrated in the accompanying drawings, which are incorporated in and constitute a part of this specification, illustrate embodiments of the disclosure and, together with the description, serve to explain the principles of the disclosure. The detailed description uses numerical and letter designations to refer to features in the drawings. Like or similar designations in the drawings and description have been used to refer to like or similar parts of the disclosure.

Referring now to the drawings, FIG. 1 is a schematic cross-sectional view of an example turbine engine in accordance with an exemplary embodiment of the present disclosure. More particularly, for the embodiment of FIG. 1, the example turbine engine is a reverse-flow turboprop engine, referred to herein as an engine 10. As shown in FIG. 1, the engine 10 defines an axial direction A (extending parallel to a longitudinal centerline or central axis 12 provided for reference), a radial direction R, and a circumferential direction C (not shown) disposed about the axial direction A. The engine 10 generally includes a propeller section 14 and a core turbine engine 16, the propeller section 14 being operable with, and driven by, the core turbine engine 16.

Though the embodiment of FIG. 1 illustrates an unducted reverse-flow turboprop engine, it will be appreciated that other types of turbine engines are contemplated herein for the discussion that follows. For example, it will be understood that turbojet engines, ducted turbofan engines, turbofan engines, turbine engines with centrifugal compressors, etc. are all contemplated for use with the various embodiments that enhance heat transfer and/or control exhaust gas stream. No limitation is intended unless otherwise required as to the type of turbine engines described herein.

As shown in FIG. 1, the core turbine engine 16 depicted generally includes an outer casing 18, which may be tubular, and that extends generally along the axial direction A. The outer casing 18 generally encloses the core turbine engine 16 and may be formed from a single casing or multiple casings.

The core turbine engine 16 includes, in an airflow downstream serial flow relationship, a compressor or high-pressure ("HP") compressor 20, a combustion section 22, a high-pressure ("HP") turbine section 24, a low-pressure ("LP") power turbine section 26, and an exhaust section 28. An air flow path generally extends through the HP compressor 20, the combustion section 22, the HP turbine section 24, the power turbine section 26, and the exhaust section 28, which are in fluid communication with each other.

The engine 10 includes one or more rotor shafts. In the exemplary engine 10 shown in FIG. 1, a first rotor shaft 30 drivingly connects the HP turbine section 24 to the HP compressor 20. As illustrated, the first rotor shaft 30 is a high-pressure ("HP") shaft or spool. A second rotor shaft 32 drivingly connects the power turbine section 26 to propeller section 14 of the engine 10. In the exemplary embodiment shown in FIG. 1, the second rotor shaft 32 is a low-pressure ("LP") shaft or spool. For the embodiment depicted, propeller section 14 includes, for example, a variable pitch fan 34 having a plurality of propeller blades 36 coupled to a disk 38 in a spaced apart manner. As depicted, the propeller blades 36 extend outwardly from a disk 38 generally along the radial direction R. Each propeller blade 36 is rotatable relative to the disk 38 about a pitch axis by virtue of the propeller blades 36 being operatively coupled to an actuation member 40, which may in some embodiments be configured to collectively vary the pitch of the propeller blades 36 in unison. The propeller blades 36, disk 38, and actuation member 40 are together rotatable about the longitudinal centerline or central axis 12. In some embodiments, for example, the propeller blades 36, disk 38, and actuation member 40 are together rotatable by the second rotor shaft 32 across a power gear box 42. The power gear box 42 can include a plurality of gears, which can allow for stepping down the rotational speed of the second rotor shaft 32 to a more efficient rotational fan speed and can be attached to one or both of a core frame or a fan frame through one or more coupling systems. The disk 38 can be covered by a rotatable spinner or front hub 44, which is typically aerodynamically contoured to promote an airflow through the plurality of propeller blades 36.

During operation of the engine 10, a volume of air 46 passes through propeller blades 36 of variable pitch fan 34 and is urged or guided toward a radial inlet 48 of core turbine engine 16. The engine 10 can include an inlet frame 50 that defines radial inlet 48 that routes an inlet portion of the flow of air 46 from radial inlet 48 downstream to the HP compressor 20. The HP compressor 20 can, in some embodiments, include one or more sequential stages of compressor stator vanes 52, one or more sequential stages of compressor rotor blades 54, and in some embodiments an impeller 56. The one or more sequential stages of compressor stator vanes 52 are coupled to the outer casing 18 and compressor rotor blades 54 are coupled to the first rotor shaft 30 to progressively compress the flow of air 46. Impeller 56 can further compress the air 46, and the air is directed into the combustion section 22 where air 46 mixes with a fuel. The combustion section 22 includes a gas combustion system 58, sometimes referred to as a combustor, which combusts the air/fuel mixture to provide combustion gases as an exhaust gas stream 60.

The exhaust gas stream 60 flows through the HP turbine section 24 that includes one or more sequential stages of turbines with turbine rotor blades 64, and in some embodiments one or more sequential stages of turbine stator vanes 62. The one or more sequential stages of turbine stator vanes 62 are typically coupled to the outer casing 18 and the turbine rotor blades 64 can be coupled to the first rotor shaft 30 and can extract thermal and/or kinetic energy from the exhaust gas stream 60. The exhaust gas stream 60 subsequently flows downstream through the power turbine section 26, where in some embodiments an additional amount of energy may be extracted through additional stages of turbine rotor blades 68 coupled to the second rotor shaft 32, and in some embodiments one or more stages of turbine stator vanes 66. The energy extraction from the HP turbine section 24 can, in some embodiments, support the operation of the HP compressor 20 through the first rotor shaft 30 and the energy extraction from the power turbine section 26 can support the operation of propeller section 14 through the second rotor shaft 32. The exhaust gas stream 60 can exit the engine 10 through the exhaust section 28.

It should be appreciated that the engine 10 depicted in FIG. 1 is by way of example only and that in other exemplary embodiments, engine 10 may have any other suitable configuration. For example, it should be appreciated that in other exemplary embodiments, engine 10 may be configured as any other suitable turbine engine, such as but not limited to a turbofan engine, turbojet engine, internal combustion engine, etc. Furthermore, although the engine 10 described above is an aeronautical turbine engine for use in a fixed-wing or rotor aircraft, in other exemplary embodiments, the engine 10 may be configured as any suitable type of turbine engine that used in any number of applications, such as a land-based, industrial turbine engine, an aeroderivative turbine engine, and/or other such engines.

In addition, in other exemplary embodiments, the engine may include any suitable number of compressors, turbines, shafts, etc. For example, as will be appreciated, the first rotor shaft 30 and the second rotor shaft 32 may further be coupled to any suitable device for any suitable purpose. For example, in certain exemplary embodiments, the engine 10 of FIG. 1 may be utilized to drive a propeller of a helicopter, may be utilized in aeroderivative applications, or may be attached to a propeller for an airplane. Additionally, in other exemplary embodiments, the engine 10 may include any other suitable type of gas combustion system, and may not include the exemplary reverse flow combustor depicted.

Figure 2:
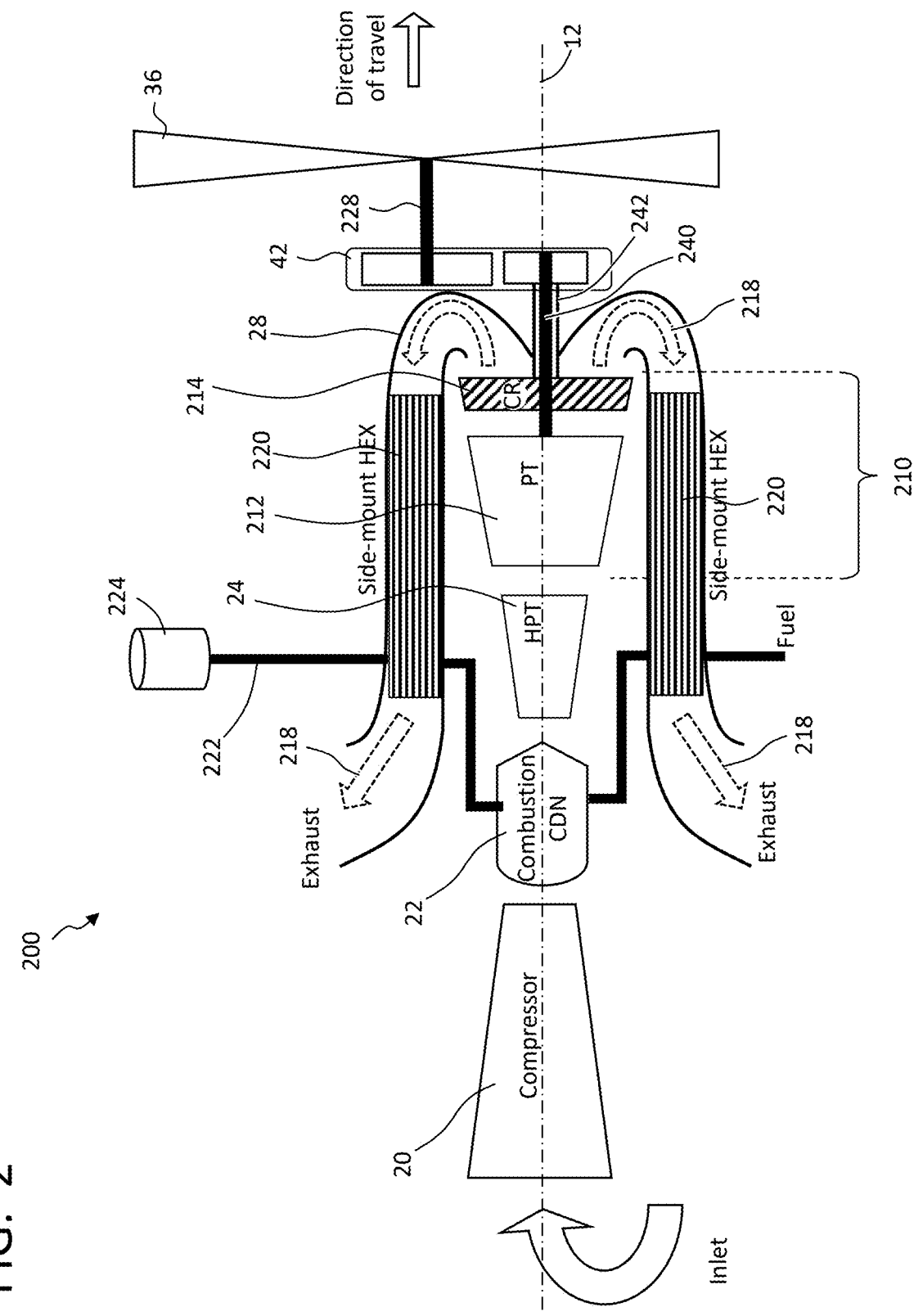
FIG. 2 illustrates a simplified block diagram of a portion of an example engine, in accordance with some embodiments.
Figure 3:
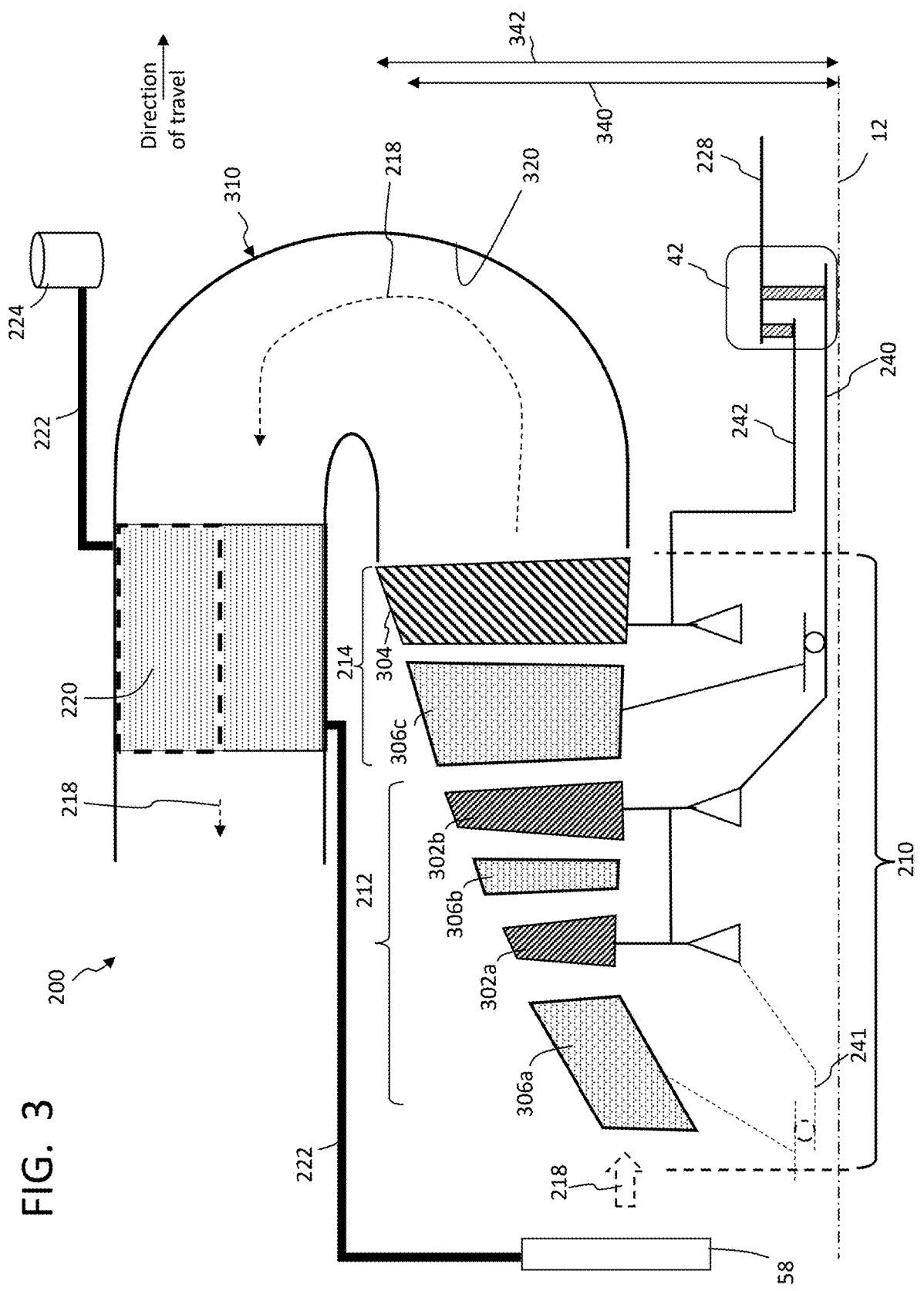
FIG. 3 illustrates a block diagram, cross-sectional half-view, relative to the central axis, of an example power turbine stage, in accordance with some embodiments.

FIG. 2 illustrates a simplified block diagram of a portion of an example engine 200, in accordance with some embodiments. The portions of the engine illustrated in FIG. 2 include, in an airflow downstream serial flow relationship, the HP compressor 20, a combustion section 22, a high-pressure ("HP") turbine section 24, a power turbine stage 210, and an exhaust section 28. FIG. 3 illustrates a block diagram, cross-sectional half-view, relative to the central axis 12, of an example power turbine stage 210 of an engine 200, in accordance with some embodiments. Referring to FIGS. 2-3, the HP turbine section 24 can include one or more HP blade rows (not shown), each with a respective set of multiple radially extended blades, that are configured to rotate about the central axis 12 in response to the exhaust gas stream from one or more combustion systems of the combustion section 22. The HP turbine section 24 can further include, in some embodiments, one or more sets of stationary vanes.

The power turbine stage 210 includes a first power turbine 212 and a second power turbine 214. Each of the first power turbine 212 and the second power turbine comprises one or more blade stages, where each blade stage comprises one or more blade rows. The first power turbine 212, in some embodiments, includes a set of one or more first turbine rotor blades 302a-302b or rotational blade rows, each with a respective set of multiple radially extended blades. The first power turbine 212 and the first turbine rotor blades 302a-302b are at least partially positioned within the exhaust gas stream 218, and typically fully within the exhaust stream, downstream of the gas combustion system 58. Further, the first power turbine 212 and turbine rotor blades are secured relative to and configured to rotate about the central axis 12 in response to the flow of the exhaust gas stream 218 with a first radius 340 from the central axis 12 (e.g., a centerline). The second power turbine 214 includes a set of one or more second turbine rotor blades 304 or rotational blade rows that are at least partially positioned within the exhaust gas stream 218 downstream from the first power turbine 212, and are configured to be secured relative to and rotate about the central axis 12, with a second radius 342 relative to the rotational axis (e.g., the central axis 12). Each of the second turbine rotor blades 304 comprise a respective set of multiple radially extended blades.

In some embodiments, the first power turbine 212 and/or the second power turbine 214 can include one or more stationary supports and/or vanes or sets of stator blade rows 306a-306c, which may be positioned adjacent one of and/or between two of the rotational sets of turbine rotor blades 302a-302b, 304. The first power turbine 212 and the second power turbine 214 together comprise a total number of blade rows (NBR) across all the stages. For example, FIG. 3 illustrates three (3) rotating blade rows of turbine rotor blades 302a-302b and 304 and three stator blade rows 306a-306c, such that the first power turbine 212 and second power turbine 214 provide a total number of blade rows (NBR) of six (6).

The portion of the engine illustrated in FIG. 3 shows, in an airflow downstream serial exhaust gas stream flow relationship, the second power turbine 214 operatively coupled with the exhaust system 310 such that exhaust gas exits the second power turbine and is directed into the exhaust system. One or more heat exchangers 220 are positioned at least partially within the exhaust system 310, downstream of the second power turbine 214, to receive and/or be contacted by the exhaust gas stream 218 downstream of the second power turbine 214 as the exhaust gas stream moves through the exhaust system 310. The heat exchanger 220 may be positioned to extend across a cross-section of an exhaust pipe of the exhaust system (e.g., with the exhaust gas stream flowing through one or more channels within the heat exchanger) or across a portion of the cross-sectional area of the exhaust path.

In some embodiments, the first power turbine, including the first turbine rotor blades 302a-302b, are secured with and/or operatively coupled with a first power rotor shaft 240 that can be mechanically cooperated, in some implementations, with a gear box 42. As described above, the gear box 42 captures the rotational power generated by the rotation of the first turbine rotor blades 302a-302b, comprising a set of one or more blades and/or blade rows, and transfers some or all of the power to a drive rotor shaft 228, which may for example power the propeller blades 36 of a propeller section 14. One or more of the turbine rotor blades 302a-302b of the first power turbine 212 may in some embodiments optionally couple 241 with a forward bearing, such as with a straddle mounted power turbine, and may be overhung from an aft side. Further, in some embodiments, the second power turbine 214, including the second rotor blade row, can be secured and/or operatively coupled with a second power rotor shaft 242. The second power rotor shaft 242 may similarly be mechanically coupled with the gear box 42 to transfer some or all of the rotational power to the drive rotor shaft 228. Thus, in some implementations, a propeller section 14 can be mechanically coupled with and rotationally driven by the gear box as a function of rotation of one or both of the first power rotor shaft 240 and the second power rotor shaft 242.

The second power turbine 214 is configured to operate at a second rotation speed that is less than a first rotation speed of the first power turbine 212. Accordingly, in some embodiments, the first power turbine 212 comprises a high speed power turbine stage, and the second power turbine 214 comprises a low speed power turbine stage. A gear ratio (GR) of the power turbine stage 210 is defined by a ratio of the second rotation speed to the first rotation speed (e.g., GR=abs(N1B/N1A), where N1B is the second speed of rotation of the second power turbine 214 and second power rotor shaft 242 (e.g., RPM (revolutions per minute)), and NIA is the first speed of rotation of the first power turbine 212 and first power rotor shaft 240 (e.g., RPM)). The slower second rotation speed provides some control over the exhaust Mach number of the exhaust gas stream 218 downstream of the second power turbine 214. Controlling the Mach number of the exhaust gas stream enhances an ability to achieve an effective heat transfer of the heat of the exhaust gas stream to the one or more heat exchangers 220. Additionally or alternatively, in some embodiments, the first turbine rotor blades 302a-302b of the first power turbine 212 are configured to rotate in a first rotational direction, while the second power turbine 214 comprises a counter-rotating (CR) power turbine with the second turbine rotor blade rotating in a second rotational direction that is opposite to the first rotational direction of the first turbine rotor blades 302a-302b. In other embodiments, the second power turbine 214 is configured to co-rotate in the same direction as the first power turbine 212 at the slower second rotation speed.

One or more fuel lines 222 that transport fuel from one or more fuel sources 224 (e.g., tanks) are routed such that a portion of the fuel line 222 is adjacent to and/or positioned within or along at least a portion of the heat exchanger 220 and fluidly coupled with the combustion system 58. The fuel line 222 is positioned so that the fuel receives heat from one or more heat exchangers 220 with the transfer of heat from the heat exchanger 220 heating the fuel. In some embodiments, the transfer of heat from the heat exchanger 220 to the fuel line 222 induces a vaporization of the fuel within the fuel line enabling the delivery of the vaporized fuel to the combustion system 58 without a need for a separate, additional heating system. The fuel can be substantially any fuel, including but not limited to cryogenic fuels (e.g., $H_2$). For example, in some embodiments, the fuel line is positioned with one or more portions of a length of the fuel line adjacent to and/or in contact with at least a portion of the length of one or more heat exchangers. One or more portions of the length of the fuel line, in some embodiments, may be embedded within at least a portion of the length of one or more heat exchangers. Further, the fuel line may be separated from the heat exchanger by a tube or other structure, such as part of an exhaust system, with one or more portions of a length of the fuel line within a threshold distance of at least a portion of the length of one or more heat exchangers to achieve the intended heat exchange. Additionally or alternatively, in some embodiments, the fuel line wraps one or more times about one or more heat exchangers, turn back and forth (e.g., serpentine) along one or more sides of one or more heat exchangers, and/or other such configurations to achieve the intended heat transfer to the fuel.

FIGS. 2-3 show a two-stage first power turbine 212 with two rotating blade rows of turbine rotor blades 302a-302b and two stator blade rows 306a-306b, and a single-stage second power turbine 214 with a single rotating blade row and a stator blade row 306c. The annulus of the blades of one or more blade rows of the first power turbine 212, in some embodiments, can be dictated by the expected first rotation speeds and the material capabilities of the respective blades. The two-stage high speed first power turbine 212 can result in a high exit swirl of the exhaust gas that flows to a low turn midframe turbine support stator blade row 306c. The annulus of the blades of the rotating blade row of the second power turbine 214 can be dictated by the expected second rotation speed and the material capabilities. In some embodiments, the second power turbine 214, downstream of the first power turbine 212, provides a low speed vaneless stage that provides a reduced exit exhaust Mach number with reduced or substantially no swirl. Further, in some embodiments the second power turbine 214 may be implemented with fewer airfoils, and these airfoils of the second power turbine have a chord that is longer than the chords of the airfoils of the first power turbine 212, with "chord" referring to a length between a leading edge of the airfoil and a trailing edge of the airfoil.

In one example, the second power turbine 214 is operated at the second rotation speed relative to the first rotation speed of the first power turbine to achieve the intended gear ratio (GR) that provides control of the exhaust Mach number (EMN) of the exhaust gas stream 218 entering the exhaust system 310. The gear ratio (GR) of the power turbine stage 210 is defined by the ratio of the second rotation speed to the first rotation speed (e.g., GR=abs(N1B/N1A), where N1B is the second speed of rotation of the second power turbine 214 and second power rotor shaft 242 (e.g., RPM), and NIA is the first speed of rotation of the first power turbine 212 and first power rotor shaft 240 (e.g., RPM)). The slower second rotation speed is implemented to provide some control over the exhaust Mach number of the exhaust gas stream 218 downstream of the second power turbine 214. By controlling the Mach number of the exhaust gas stream, some embodiments enhance an ability to achieve an effective heat transfer of the heat of the exhaust gas stream to the one or more heat exchangers 220.

In some embodiments, the operation of the second power turbine 214 at the reduced second rotation speed causes a reduction in the exhaust Mach number (EMN) of the exhaust gas stream 218 as a function of the gear ratio (GR), following the second power turbine 214, such that the exhaust Mach number is less than or equal to 0.25 leaving the second power turbine and/or when contacting the heat exchanger 220, and in some embodiments 0.2<EMN<0.25. The utilization of the second power turbine 214 operating at the reduced rotation speed enables the airfoil height of the blades of the second power turbine 214 to be taller than the blades of the turbines of the first power turbine 212, which provides a greater annulus area, and thus the exhaust velocity of the exhaust gas stream 218 is reduced.

The exhaust system 310 is fluidly coupled downstream of the second power turbine 214 and comprises an exhaust path that is configured to direct the exhaust gas stream 218 away from the second power turbine. Further, in some embodiments, the exhaust path of the exhaust system 310 can include a bend collector 320 positioned prior, in the exhaust path, to the one or more heat exchangers 220. The amount of bend may vary as a function of design considerations and/or performance. In some embodiments, the bend collector 320 can comprise a 180 degree bend collector 320 that allows for a compact design of the exhaust system 310 and the positioning of the heat exchangers in close proximity to the combustion system 58. The positioning of the one or more heat exchangers 220 close to the combustion system 58 provides for reduced length of the fuel line between the heat exchangers 220 and the combustion system 58, which can further provide for improved packaging and/or minimum gas fuel piping, while a transfer bus is typically not needed. In some embodiments, the bend collector 320 of the exhaust path provides a first portion of the exhaust path, after the bend collector 320 and downstream along the exhaust gas path from the bend collector, that can extend generally parallel with the central axis 12 of the engine 10 at a first radial distance from the engine central axis that is greater than the first radius 340 of the first power turbine 212 and greater than the second radius 342 of the second power turbine 214. The one or more heat exchangers 220 can, in some embodiments, be coupled with the first portion of the exhaust path as the exhaust path extends along the side of the engine 200 enhancing the compact design of the exhaust system 310 and engine 200.

Figure 4:
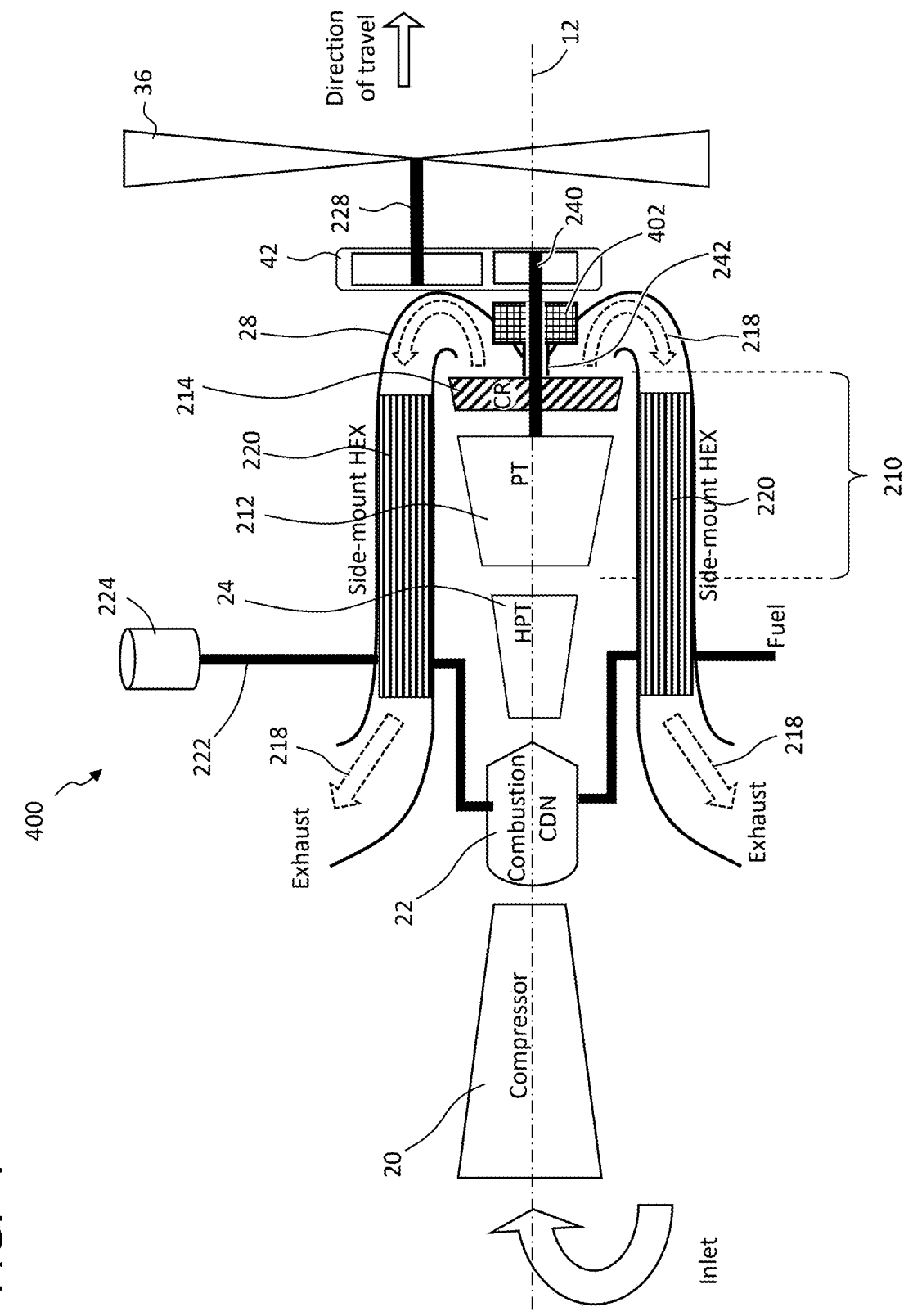
FIG. 4 illustrates a simplified block diagram of a portion of an example engine, in accordance with some embodiments.
Figure 5:
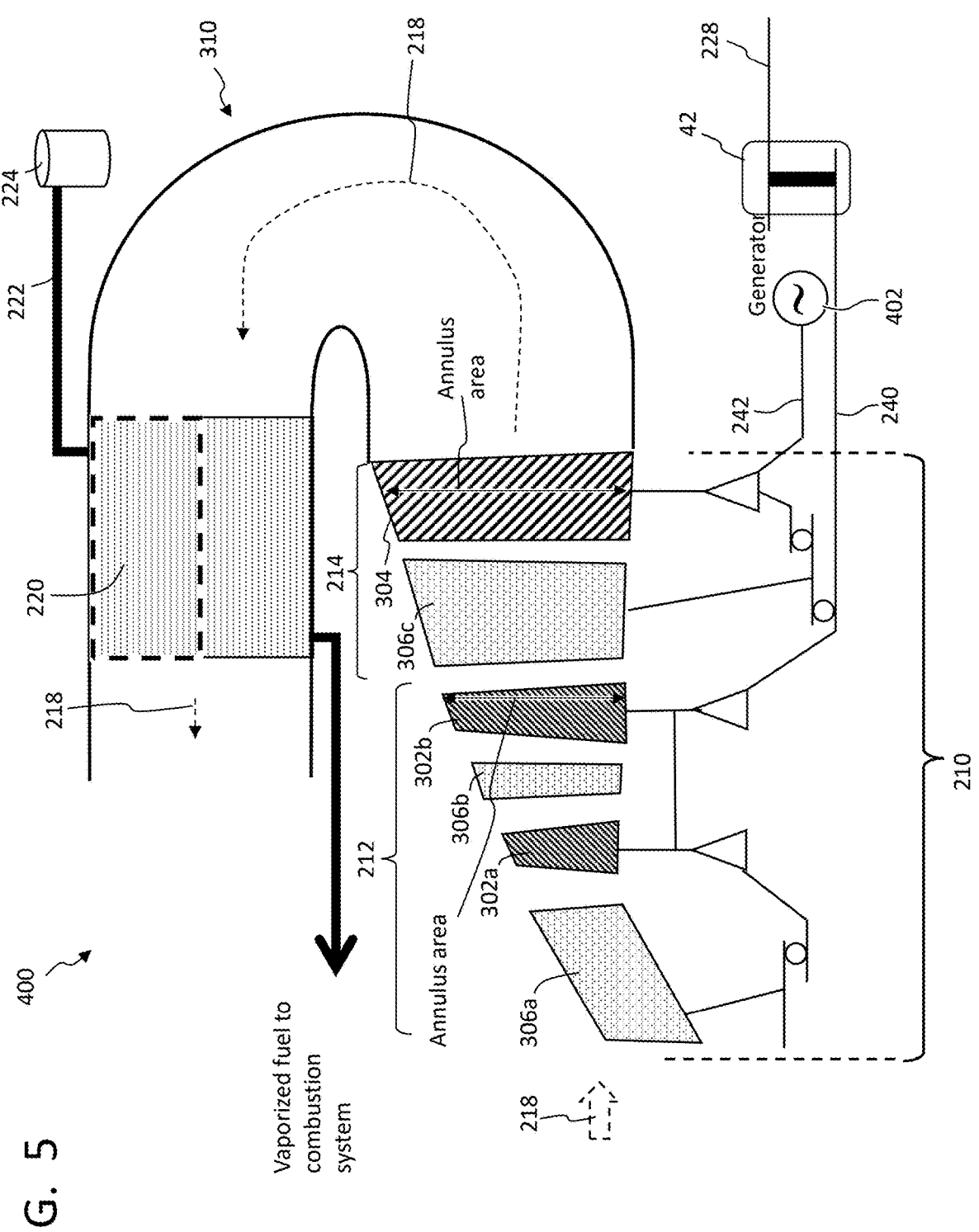
FIG. 5 illustrates a simplified cross-sectional half-view, relative to the central axis, of the example power turbine stage, in accordance with some embodiments.

The use of the second power turbine 214 can be utilized with other engine configurations in cooperation with a first power turbine 212. FIG. 4 illustrates a simplified block diagram of a portion of an example engine 400, in accordance with some embodiments. FIG. 5 illustrates a simplified cross-sectional half-view, relative to the central axis 12, of the example power turbine stage 210 of FIG. 4, in accordance with some embodiments. Referring to FIGS. 4-5, the first power turbine 212 is secured with the first power rotor shaft 240 that is mechanically coupled with a power gear box 42. The second power turbine 214 of the engine 400 is secured with the second power rotor shaft 242 that is coupled with one or more generators 402. The generator 402 can be powered by the second power rotor shaft to generate electrical power that can be used by the engine 200 and/or other system components of the aircraft or other vehicle in which the engine is incorporated. The second power turbine 214, in some embodiments, is implemented as a relatively low speed, counter rotating turbine to rotate in a second direction that is opposite to a first direct that the first power turbine 212 rotates. In other implementations, the second power turbine is operated with a rotational direction that is the same as the first power turbine 212. The one or more heat exchangers 220 can be positioned along sides of the turbine core providing a compact design, and in some embodiments the one or more heat exchangers and fuel line 222 maintained to non-rotating portions of the engine 200. The length of the one or more heat exchangers can vary and is typically determined as a function of one or more of: needed heat transfer relative to the length of the fuel line positioned adjacent the one or more heat exchangers, the expected heat of the exhaust gas stream, and/or the flow rate of the exhaust gas stream.

A high speed power turbine stage comprising the first power turbine 212 can comprise two or more blade rows, and typically is between two and fourteen blade rows (e.g., 2 rows 14). Additionally or alternatively, a low speed power turbine stage comprising the second power turbine 214 can comprise one or more blade rows, and typically between one and eight blade rows (e.g., 1 rows 8). For example, the first power turbine 212 provides a high-speed, two-stage power turbine with two rotating blade rows, and a single-stage second power turbine 214 with a single rotating blade row comprising second turbine rotor blade(s) 304. The annulus of the blades can be dictated by the expected rotation speeds and the material capabilities of the respective blades. The two-stage first power turbine 212 can result in a high exit swirl of the exhaust gas. The annulus of the blades of the rotating blade row of the second power turbine 214 can be dictated by the expected slower second rotation speed and the material capabilities. Further, in some embodiments the second power turbine 214 may be implemented with low count airfoils having a chord that is longer than the chords of the airfoils of the first power turbine 212.

Figure 6:
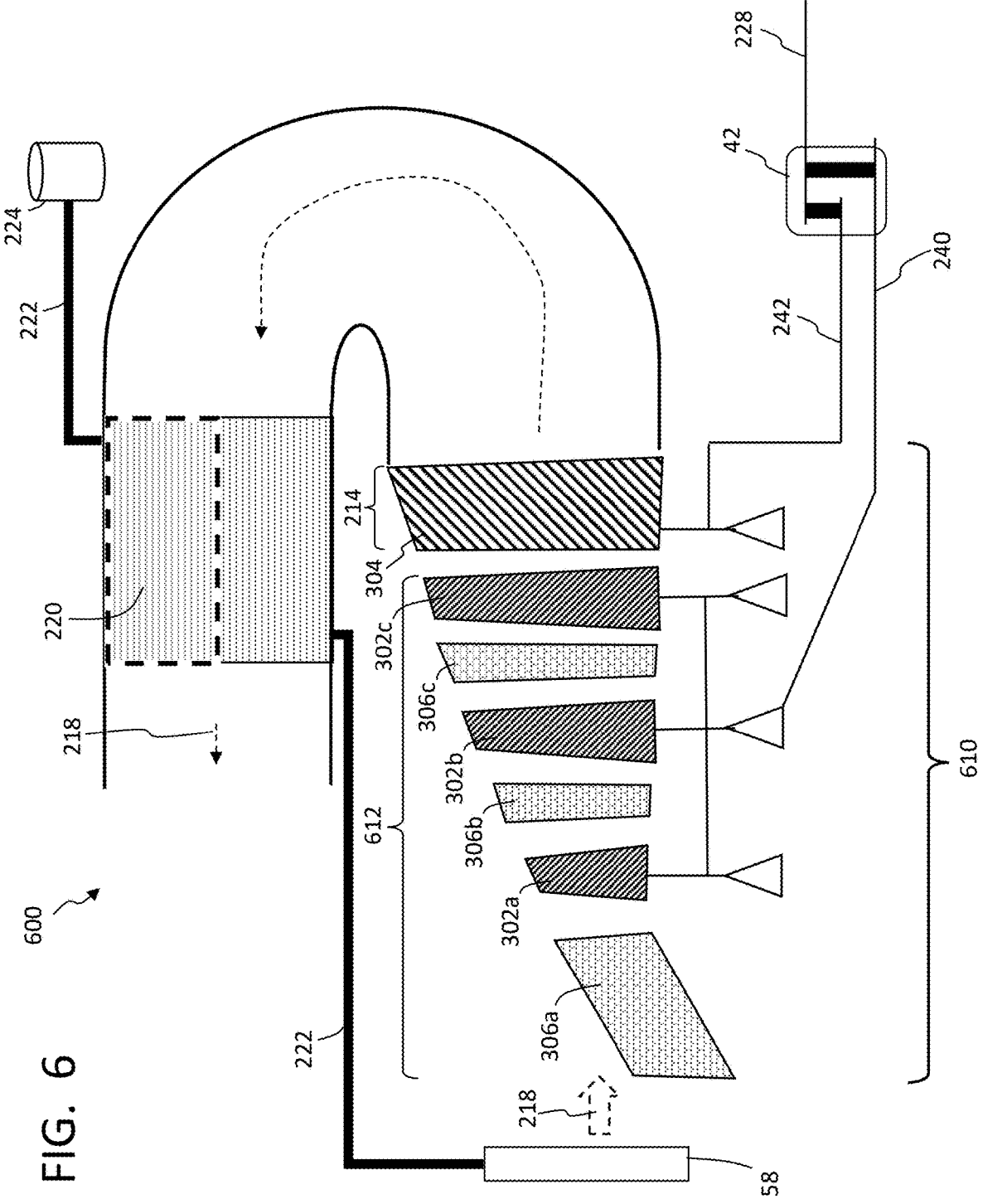
FIG. 6 illustrates a simplified cross-sectional half-view of the example portion of an engine with a power turbine stage, in accordance with some embodiments.

As described above, the first and second power turbines 212, 214 can be implemented with different numbers of blade rows. FIG. 6 illustrates a simplified cross-sectional half-view of the example portion of an engine 600 with a power turbine stage 610, in accordance with some embodiments. The power turbine stage 610 can include a first power turbine 612 and a second power turbine 214 without a midframe and/or vanes between the first power turbine 612 and the second power turbine 214. As such, in some embodiments, the power turbine stage 610 is configured with the blade row, of the second power turbine 214, directly adjacent to a final stage rotational blade row of the first power turbine 612, without a vane structure comprising one or more vanes and/or other such midframe between the first power turbine 612 and the second power turbine 214. The first power turbine, in this example, is a three-stage, high speed power turbine with three rotational blade rows of turbine rotor blades 302a-302c that induces a high exit swirl of the exhaust gas stream 218 secured with a first power rotor shaft 240 that is mechanically coupled with a power gear box 42. The second power turbine 214 can be secured with a second power rotor shaft 242 that is coupled with the gear box 42. The second power turbine 214, in some embodiments, is implemented as a relatively low speed, vaneless counter rotating turbine with, in this example, one stage comprising a single rotational blade row that rotates in a second direction that is opposite to a first direct that the first power turbine 612 rotates. One or more heat exchangers 220 are positioned at least partially within the exhaust flow path.

The one or more heat exchangers 220 can be positioned along sides of the turbine core providing a compact design, and in some embodiments the one or more heat exchangers and one or more fuel lines 222 are maintained to non-rotating portions of the engine 600. The length of the one or more heat exchangers can vary, and is typically determined as a function of one or more of needed heat transfer relative to the length of fuel line positioned adjacent the one or more heat exchangers, the expected temperature ranges of the exhaust gas stream, and/or the flow rate of the exhaust gas stream. For example, the first power turbine 612 can provide a high-speed, three-stage power turbine with three rotating blade rows and stator blade rows 306a-306c, and a vaneless, single-stage second power turbine 214 with a single rotating blade row. The annulus of the blades can be dictated by the expected rotation speeds and the material capabilities of the respective blades. The three-stage high speed first power turbine 612 can result in a high exit swirl of the exhaust gas. The annulus of the blades of the rotating blade row of the second power turbine 214 can be dictated by the expected slower second rotation speed and the material capabilities. In some embodiments, the second power turbine 214, downstream of the first power turbine 612, provides a low speed vaneless stage. Further, in some embodiments the second power turbine 214 may be implemented with low count airfoils having a chord that is longer than the chords of the airfoils of the first power turbine 212.

Figure 7:
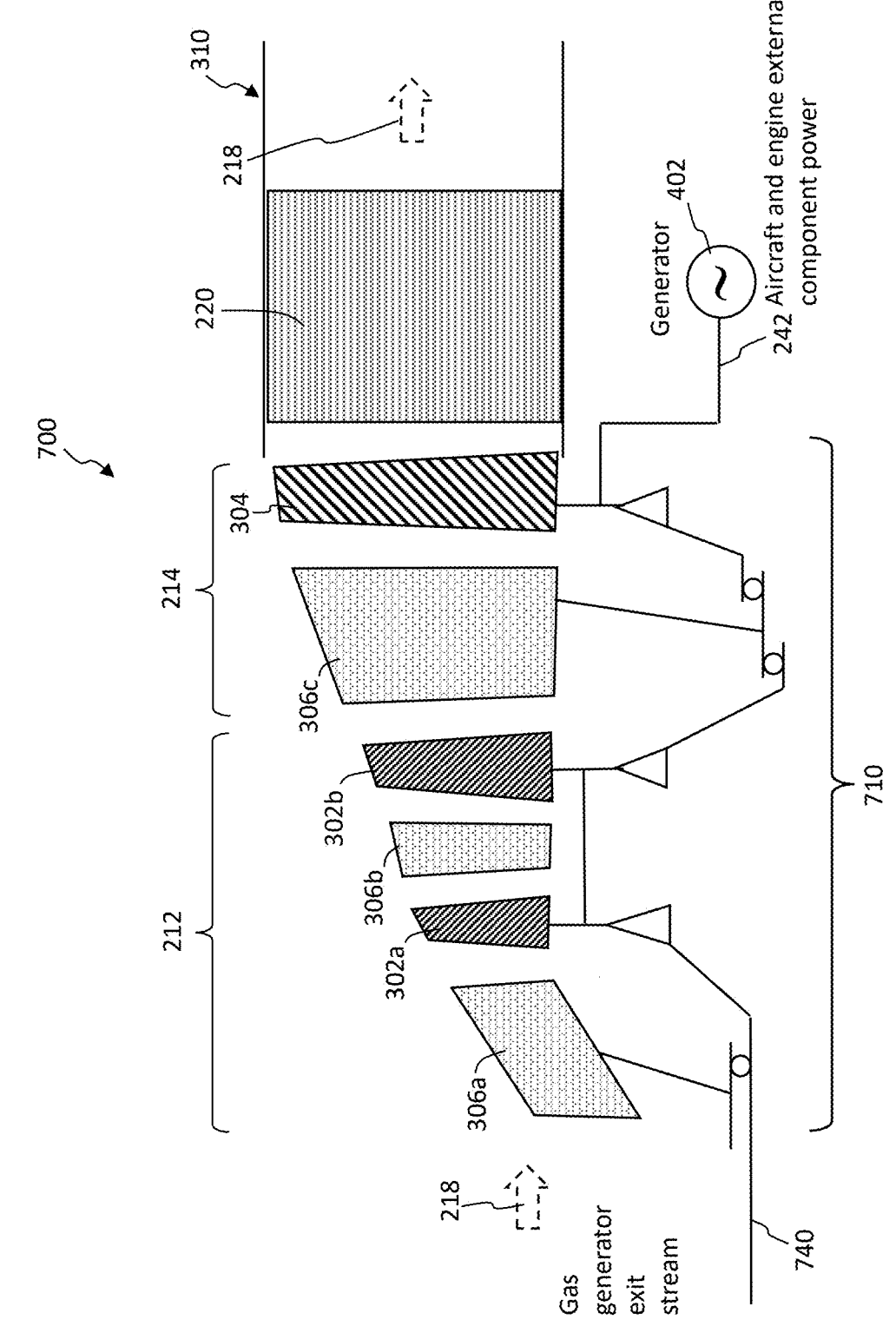
FIG. 7 illustrates a simplified cross-sectional half-view of the example portion of an example forward shaft engine with a power turbine stage, in accordance with some embodiments.

FIG. 7 illustrates a simplified cross-sectional half-view of the example portion of an example forward shaft engine 700 with a power turbine stage 710, in accordance with some embodiments. The power turbine stage 710 includes a first power turbine 212, and a second power turbine 214. In some embodiments, the first power turbine 212 and/or the second power turbine 214 include one or more structural midframes and/or vanes or sets of stator blades, which may be positioned adjacent one of and/or between two of the rotational sets of turbine rotor blades 302a-302b, 304. For example, some embodiments include a structural midframe stator blade row 306c immediately upstream of the second turbine rotor blade 304 of the second power turbine 214. The structural midframe stator blade row 306c can be a non-turning or low-turning stage in embodiments where the second power turbine 214 is a counter-rotational turbine that rotates in a second direction that is opposite to a first rotation direction that the first power turbine rotates. In other embodiments, the structural midframe stator blade row 306c can be a turning stage in embodiments where the second turbine rotor blade 304 of the second power turbine 214 is a co-rotational turbine that rotates in the second direction that is the same direction as a first rotation direction that the first power turbine rotates. Further, the addition of the midframe stator blade can allow for a maximizing of duct expansion while achieving the reduced or minimum inlet exhaust gas Mach number from the second power turbine 214.

In the example illustrated in FIG. 7, the first power turbine 212 is a two-stage power turbine with two rotating turbine blade rows and provides a high exit swirl of the exhaust gas stream upstream of the second power turbine 214. The first power turbine 212 can be secured with and/or coupled with a forward power rotor shaft 740 that can be mechanically coupled, in some implementations, with a gear box (not shown). The second power turbine 214, in some embodiments, can be secured within a second power rotor shaft 242 that can couple with one or more generators 402. In other embodiments, the second power rotor shaft may couple with the gear box. One or more heat exchangers 220 are cooperated, in-line with the second power turbine 214, within a portion of the exhaust system 310. One or more fuel lines 222 are routed such that a portion of the fuel line is positioned adjacent to, within a threshold distance of and/or within one or more of the heat exchangers 220, such that convected heat from the one or more heat exchangers heat and/or vaporize the fuel prior to the combustion system 58. For example, in some implementations, the fuel is routed to be in direct contact with the heat exchanger, which is immersed in the exhaust stream. Heat is convected from the exhaust gas to heat exchanger tubing, conducted across the metal of the tubing, and convectively heats the fuel. The in-line positioning of the one or more heat exchangers 220 enables a more compact design.

Figure 8:
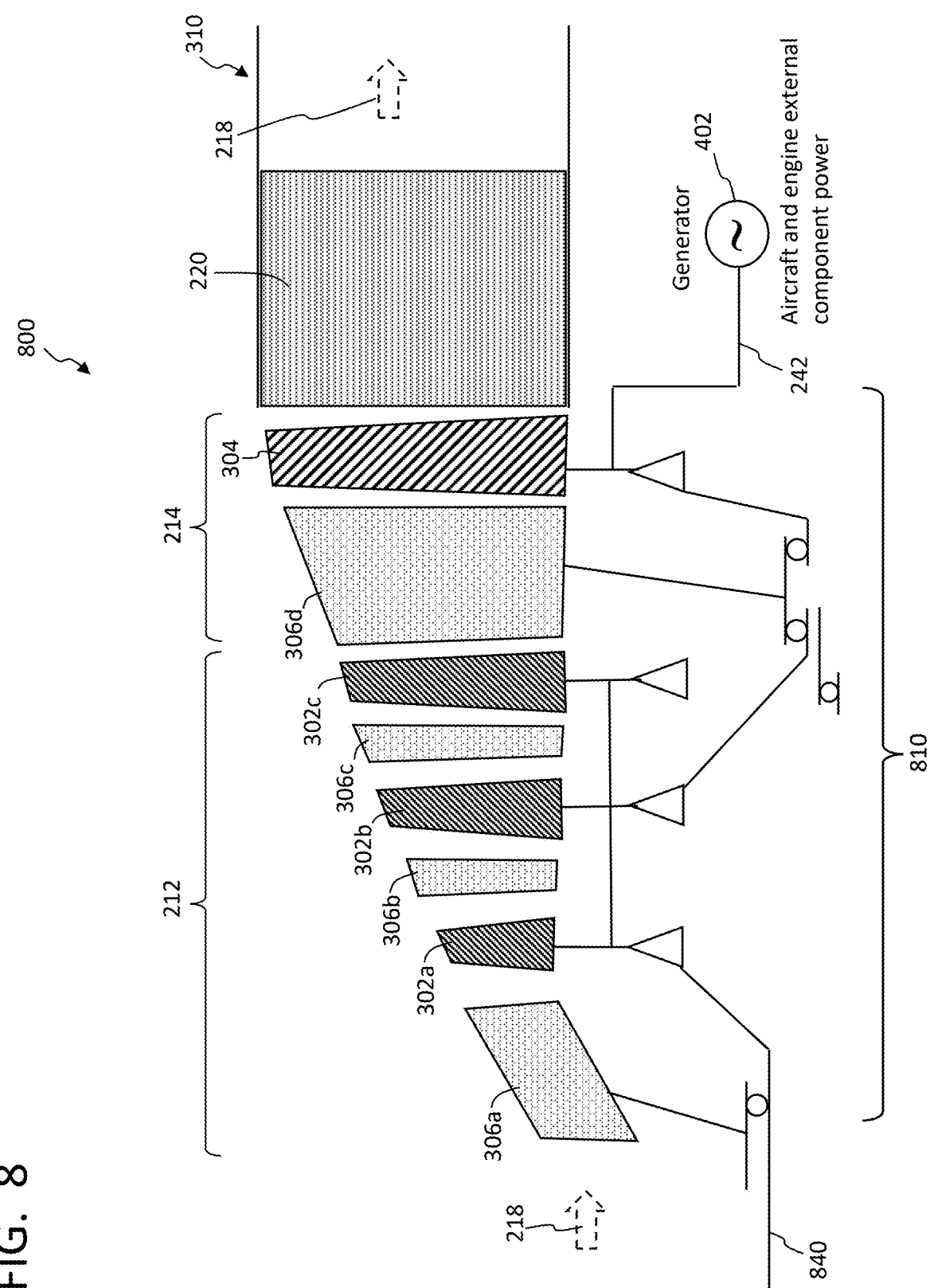
FIG. 8 illustrates a simplified cross-sectional half-view of the example portion of an example forward shaft engine with a power turbine stage, in accordance with some embodiments.

FIG. 8 illustrates a simplified cross-sectional half-view of the example portion of an example forward shaft engine 800 with a power turbine stage 810, in accordance with some embodiments. The power turbine stage 810 can include a three-stage first power turbine 612 with three turbine rotor blades 302a-302c and a single stage second power turbine 214 positioned downstream of the first power turbine 212. In some embodiments, the first power turbine 212 and/or the second power turbine 214 can include one or more structural midframes and/or vanes or sets of stator blade rows 306a-306d, which may be positioned adjacent one of and/or between two of the rotational sets of turbine rotor blades 302a-302c, 304. For example, some embodiments can include a structural midframe stator vane row immediately upstream of the second turbine rotor blade 304 of the second power turbine 214. The structural midframe stator vane of the stator blade row 306d is a low-turning stage in embodiments where the second power turbine 214 is a counter-rotational turbine that rotates in a second direction that is opposite to a first rotation direction that the first power turbine rotates. In other embodiments, the structural midframe stator vane row may not be present in embodiments where the second power turbine 214 is a co-rotational turbine that rotates in the second direction that is the same direction as a first rotation direction of the first power turbine.

The first power turbine 212 rotates at the first rotation speed and can provide a high exit swirl of the exhaust gas stream upstream of the second power turbine 214. The second power turbine is operated at the slower second rotation speed. The first power turbine 212 can be secured with and/or coupled with a forward power rotor shaft 840 that can be mechanically cooperated, in some implementations, with a gear box (not shown). The second power turbine 214, in some embodiments, can be secured within a second power rotor shaft 242 that can couple with one or more generators 402. In other embodiments, the second power rotor shaft may couple with the gear box. One or more heat exchangers 220 are cooperated, in-line with the second power turbine 214, within a portion of the exhaust system 310. One or more fuel lines 222 are routed such that a portion of the respective fuel line is positioned adjacent to, within a threshold distance of, and/or within one or more of the heat exchangers 220, such that convected heat from the one or more heat exchangers heat and/or vaporize the fuel prior to the combustion system 58. The in-line positioning of the one or more heat exchangers 220 can in part enable a more compact design.

Figure 9:
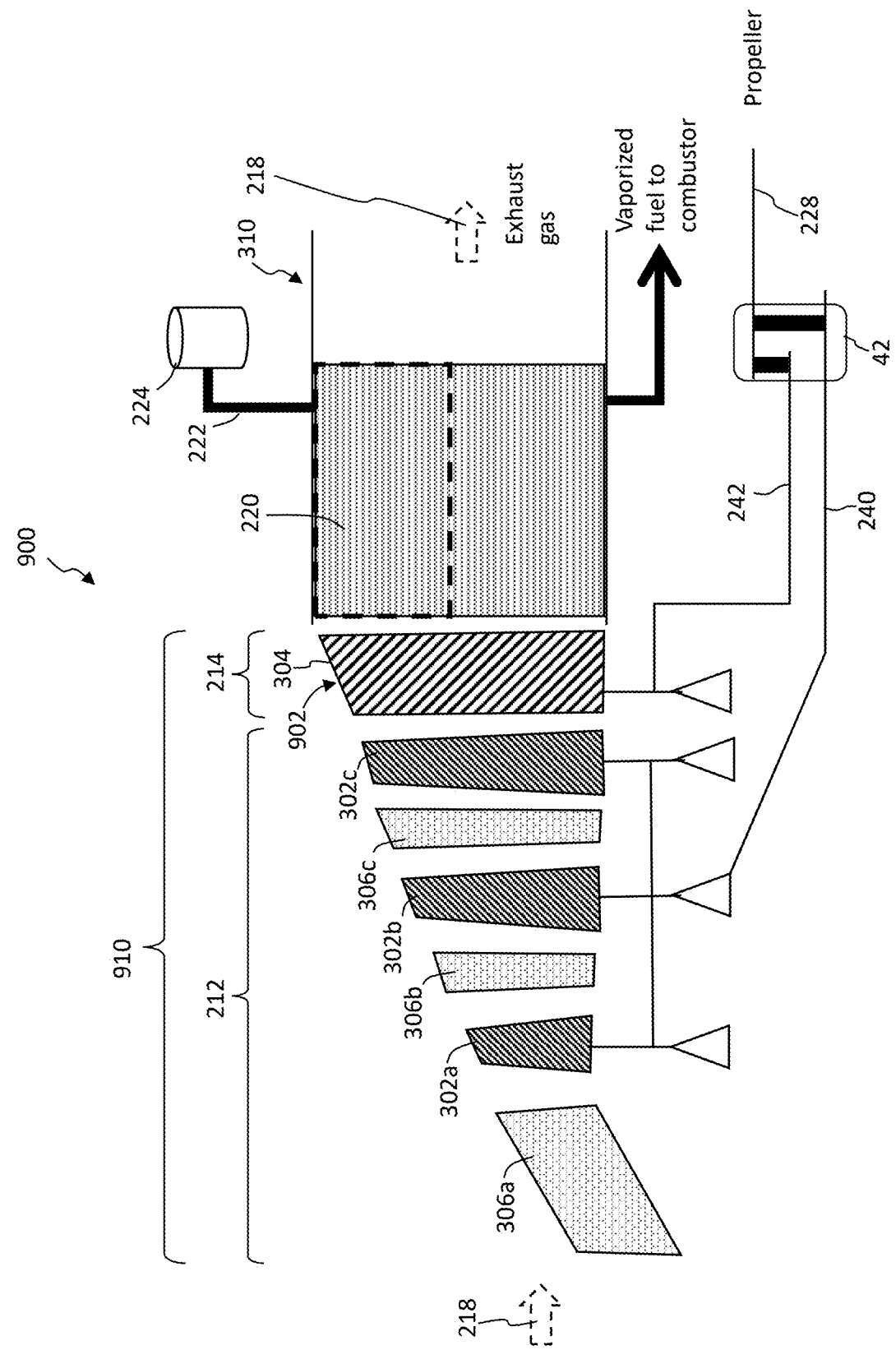
FIG. 9 illustrates a simplified cross-sectional half-view of the example portion of an example forward shaft engine with a power turbine stage, in accordance with some embodiments.

FIG. 9 illustrates a simplified cross-sectional half-view of the example portion of an example forward shaft engine 900 with a power turbine stage 910, in accordance with some embodiments. The power turbine stage 910 includes a first power turbine 212, and a second power turbine 214. In some embodiments, the first power turbine 212 and/or the second power turbine 214 can include one or more structural midframes and/or vanes or sets of stator blade rows 306a-306c, which may be positioned adjacent one of and/or between two of the rotational sets of turbine rotor blades 302a-302b, 304. The power turbine stage 910, in some embodiments, includes the first power turbine 212, and the second power turbine 214 without a midframe and/or vanes between the first power turbine 212 and the second power turbine 214. As such, in some embodiments, the power turbine stage 910 is configured with the second blade row of the second power turbine 214 directly adjacent to and downstream of a final stage blade row of the first power turbine 212. The second power turbine 214 can operate as a counter-rotational turbine that rotates in a second direction that is opposite to a first rotation direction that the first power turbine rotates, and provides a low speed, vaneless counter-rotating stage. Further, in some embodiments the second power turbine 214 may be implemented with low count airfoils each having a chord that is longer than the chords of the airfoils of the first power turbine 212, at relatively low tapers. In some embodiments, the second power turbine enables a rotating expansion that allows a relatively high wall slope 902, e.g., greater than 3 times a duct slope limit, and in some instances about 5 times the duct slope limit. The duct slope limit is how a diffusion limit is applied where the exhaust gas flow will tolerate a limited amount of diffusion (area increase) over a given distance without separating. Here, expansion through the low speed power turbine enables the greater wall slope.

In the example illustrated in FIG. 9, the first power turbine 212 is a three-stage power turbine with three rotating turbine blade rows and provides a high exit swirl of the exhaust gas stream upstream of the second power turbine 214. In some embodiments, the first power turbine 212 can be secured with and/or coupled with a first power rotor shaft 240 that can be mechanically cooperated, in some implementations, with a gear box 42. Similarly, in some implementations, the second power turbine 214 can be secured within a second power rotor shaft 242 that can couple with the gear box 42. One or more heat exchangers 220 are cooperated, in-line with the second power turbine 214, within a portion of the exhaust system 310. One or more fuel lines 222 are routed such that a portion of the respective fuel line is positioned adjacent to, within a threshold distance of, and/or within one or more of the heat exchangers 220, such that convected and/or radiated heat from the one or more heat exchangers heat and/or vaporize the fuel prior to the combustion system 58. In some embodiments, one or more fuel lines supply fuel to an inlet ("cold") side of the heat exchanger, which can comprise tubes or some impermeable membrane that conduct heat. The heat exchanger(s) are immersed in the exhaust gas stream. Convection of heat from the exhaust gas to the tubes followed by convection to the fuel heats the fuel, and in some implementations causes the evaporation of the fuel to occur. One or more fuel lines can supply fuel to the inlet side of the heat exchanger, and one or more separate lines can collect the fuel vapor from at an exit side of the heat exchanger and carry the fuel vapor to the fuel injector in the combustor. The in-line positioning of the one or more heat exchangers 220 can in part enable a more compact design.

Figure 10:
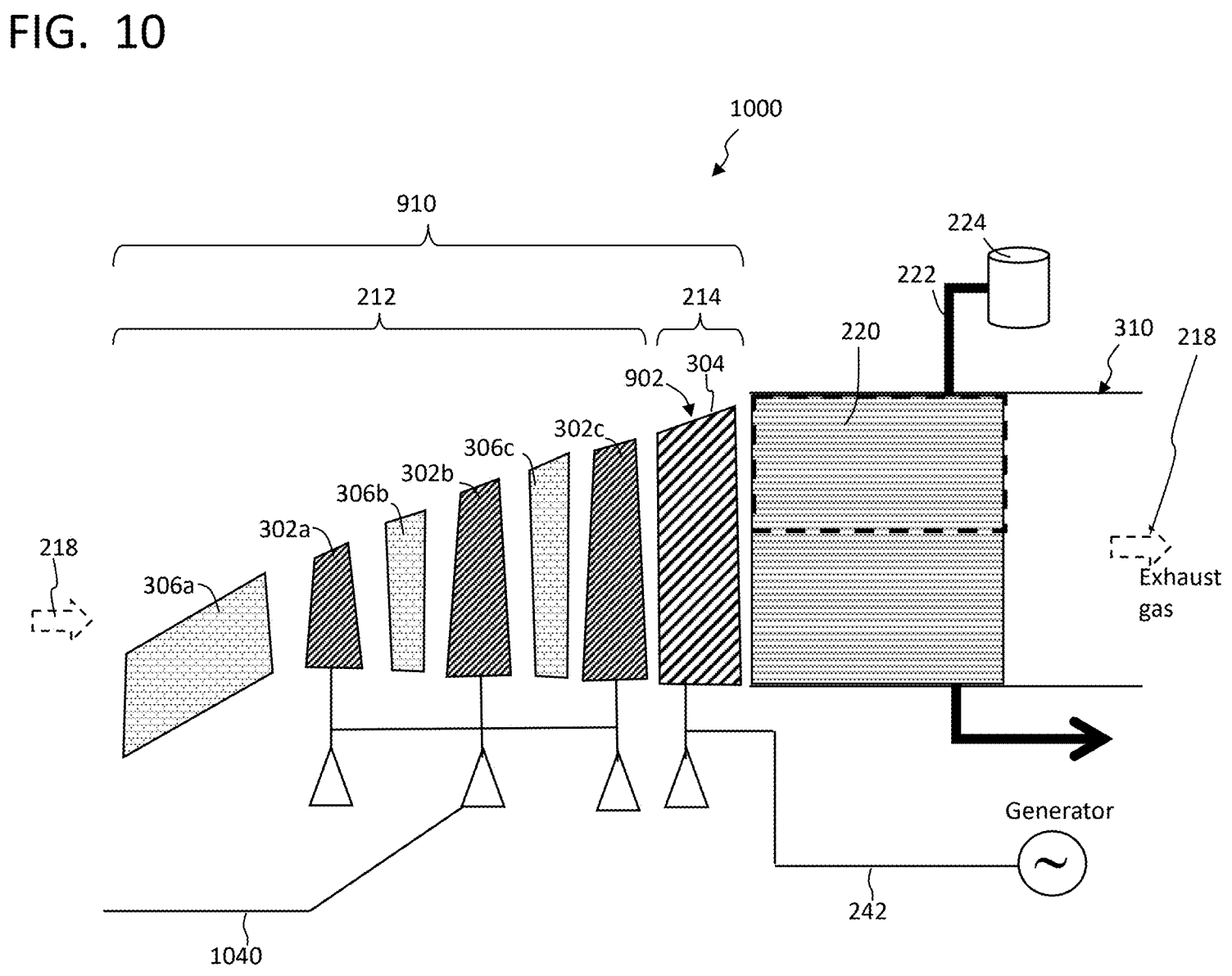

FIG. 10 illustrates a simplified cross-sectional half-view of the example portion of an example forward shaft engine 1000 with a power turbine stage 910, in accordance with some embodiments. The power turbine stage 910 includes a first power turbine 212, and a second power turbine 214. In some embodiments, the first power turbine 212 and/or the second power turbine 214 can include one or more structural midframes and/or vanes or sets of stator blade rows 306a-306c, which may be positioned adjacent one of and/or between two of rotational sets of turbine rotor blades 302a-302b, 304. The power turbine stage 910, in some embodiments, includes the first power turbine 212, and the second power turbine 214 without a midframe and/or vanes between the first power turbine 212 and the second power turbine 214. As such, in some embodiments, the power turbine stage 910 is configured with a second blade row, of the second power turbine 214, directly adjacent to and downstream of a final stage first blade row of the first power turbine 212. The second power turbine 214 can operate as a counter-rotational turbine that rotates in a second direction that is opposite to a first rotation direction that the first power turbine rotates. Further, in some embodiments the second power turbine 214 may be implemented with low count airfoils each having a chord that is longer than the chords of the airfoils of the first power turbine 212, at relatively low tapers. In some embodiments, the second power turbine enables a rotating expansion that allows a relatively high wall slope 902 (e.g., greater that 3 times a duct slope limit, and in some instances about 5 times the duct slope limit).

In the example illustrated in FIG. 10, the first power turbine 212 is a three-stage power turbine with three rotating turbine blade rows, and provides a high exit swirl of the exhaust gas stream upstream of the second power turbine 214. The example power turbine stage 910 of FIG. 10 illustrates three (3) rotating blade rows of the first power turbine 212, three stator blade rows 306a-306c of the first power turbine 212, and a single stage single rotating blade row of the second power turbine 214, such that the combination of the first power turbine 212 and the second power turbine 214 provide a total number of blade rows (NBR) of seven (7).

The first power turbine 212 can be secured with and/or coupled with a forward power rotor shaft 1040 that can be mechanically cooperated, in some implementations, with a gear box 42. The second power turbine 214, in some embodiments, can be secured within a second power rotor shaft 242 that can couple with one or more generators 402. One or more heat exchangers 220 are cooperated, in-line with the second power turbine 214, within a portion of the exhaust system 310. One or more fuel lines 222 are routed such that a portion of the respective fuel line is positioned adjacent to, within a threshold distance of, and/or within one or more of the heat exchanger 220, such that convected heat from the heat exchanger heats and/or vaporizes the fuel prior to the combustion system 58. The in-line positioning of the one or more heat exchangers 220 in part enables a more compact design.

Designing components for an engine is generally a very labor intensive and time-consuming process that involves careful consideration of the interrelated factors that directly influence engine operation and performance. The inventors developed numerous engines to maximize efficiency of engines, including turbine engines during in-flight propulsion of an aircraft, and correspondingly reduce fuel consumption. The inventors developed systems within an engine to provide fuel vaporization prior to injection into a gas combustion system of an engine to improve performance, efficiency, and other benefits. The inventors, in developing several different engine architectures including those discussed above, considered how power turbines and operation of power turbines can be changed to achieve mission requirements relative to at least heat exchange, and/or how the power turbines could improve upon an existing engine efficiency and/or fuel consumption. The inventors looked at several engine architectures, then determined how power turbine configurations, numbers of blade rows, gear ratios, system effectiveness control, and other factors affect exhaust flow enabling improved efficiency in heat transfer to one or more heat exchangers that are used to heat fuel prior to being fed into one or more gas combustion systems of the engine improving, at least in part, engine efficiency and/or fuel consumption.

The inventors further determined that exhaust Mach numbers of many other engines, including other turboprop engines, are commonly above 0.3, and typically 0.35-0.45 or greater. The inventors also discovered that there is a low efficiency of heat exchange in heat exchangers using exhaust gases having a high Mach number; in other words, the high speed of the exhaust does not allow for as much heat energy to be transferred from the exhaust gasses through the heat exchanger(s) to, for example, a fuel line. To address this reduced heat exchange efficiency at such elevated Mach numbers, heat exchangers typically have to be excessively long and/or exhaust gas diffusers are incorporated upstream of heat exchangers, which adversely affect the size of an engine, and often cannot be used due to mechanical constraints. In particular, the inventors discovered that the incorporation of a second power turbine stage operated at a relative reduced rotational speed and/or rotational direction induces a reduction in the exhaust gas stream velocity that greatly increases the heat exchange capabilities between the exhaust gas stream and one or more heat exchangers. The implementation of the second power turbine stage operated at the low rotation speed lowers the exhaust velocity without a dedicated diffuser section and capitalizes on that lower velocity with higher membrane area, which improves the heat exchanger efficiency.

The inventors further found that by controlling the difference in rotational speeds of first power turbine 212 and the second power turbine 214 of the power turbine stage 210 as a function of a number of blade rows achieves a desired exhaust gas stream Mach number that is significantly reduced over other engines, which enables a more effective heat exchange. This effective heat exchange enables the exhaust gas stream to be used to transfer heat to the fuel and improve the efficiency of the operation of the engines.

The determination of the relationship between numbers of blade rows relative to rotation speeds of the first and second power turbines 212, 214 to achieve a desired efficiency and/or exhaust Mach number of the exhaust gas stream often required a time consuming, iterative process. As explained in greater detail below, after evaluation of numerous turbine engine architectures having different numbers of blade rows and varying rotation speeds, the inventors developed engines according to certain relationships between the number of blade rows (NBR) and a resulting exhaust gas stream Mach number. The inventors further discovered that a gear ratio (GR), defined as a function of different rotation speeds of two or more of the power turbines within the number of blade rows, relative to the number of blade rows provide a system effectiveness control (SEC) needed to produce improved results in terms of exhaust gas stream Mach numbers and engine efficiency. It was still further found that a counter rotation of a power turbine within the number of blade rows additionally improves the efficiency of heat transfer in controlling the exhaust Mach number of the exhaust flow to produce improved results in terms of engine efficiency.

Various aspects of the present disclosure describe aspects of engines, including at least aircraft engines, including turboprop engines, characterized in part by a control of a correlation between a number of blade rows and a gear ratio, which result in an improved heat transfer that is used to heat fuel being fed to the engine, to improve fuel efficiency, improved engine design, and other such advantages. Accordingly, an engine to power an aircraft in flight comprises a first power turbine, of a power turbine section of the engine, that is operated at a first rotation speed, a second power turbine operated at a different second speed. Table 1 illustrates Examples 1-19 of values of the number of blade rows, with the first power turbine 212 and second power turbine 214 operated at different speeds (here, rotation speed N1A of the first power turbine 212, and rotation speed N1B of the second power turbine 214), and the corresponding relationships for number of blade rows (NBR) and gear ratio (GR) with the resulting system effectiveness control (SEC).

TABLE 1

| EX.# | NBR | HSSC | LSSC | N1A | N1B | GR |
|------|-----|------|------|--------|---------|------|
| 1 | 3 | 2 | 1 | 11100 | −10767 | 0.97 |
| 2 | 3 | 2 | 1 | 22150 | −20378 | 0.92 |
| 3 | 3 | 2 | 1 | −13247 | 11723.6 | 0.89 |
| 4 | 3 | 2 | 1 | −8500 | 7395 | 0.87 |
| 5 | 5 | 4 | 1 | 6600 | −6593.4 | 1.00 |
| 6 | 4 | 2 | 2 | −6600 | 6336 | 0.96 |
| 7 | 4 | 2 | 2 | 17204 | −15483.6 | 0.90 |
| 8 | 5 | 4 | 1 | −3300 | 2805 | 0.85 |
| 9 | 4 | 2 | 2 | 2800 | −2296 | 0.82 |
| 10 | 6 | 4 | 2 | 13247 | −12452.2 | 0.94 |
| 11 | 7 | 6 | 1 | 8120 | −6902 | 0.85 |
| 12 | 7 | 4 | 3 | 13247 | −10332.7 | 0.78 |

TABLE 1-continued

| EX.# | NBR | HSSC | LSSC | N1A | N1B | GR |
|------|-----|------|------|------|------|------|
| 13 | 6 | 4 | 2 | −8120 | 6008.8 | 0.74 |
| 14 | 8 | 6 | 2 | 7500 | −6675 | 0.89 |
| 15 | 12 | 8 | 4 | 7500 | −5325 | 0.71 |
| 16 | 12 | 6 | 6 | −7000 | 6650 | 0.95 |
| 17 | 16 | 8 | 8 | 8800 | −7568 | 0.86 |
| 18 | 16 | 10 | 6 | 6700 | −4020 | 0.60 |
| 19 | 16 | 8 | 8 | −8800 | 7920 | 0.90 |

In Table 1, EX #identifies the example number, NBR is the number of blade rows of the power turbine stage 210 comprising the combination of rotating blades and stator vanes, HSSC is the High Speed Stage Blade Row Count of the first power turbine 212 comprising one or more rotating blades and one or more stator vanes, LSSC is the Low Speed Stage Blade Row Count of the second power turbine 214 comprising one or more rotating blades and when relevant one or more stator vanes, NIA is the first speed of rotation of the first power turbine 212 and first power rotor shaft 240, N1B is the second speed of rotation of the second power turbine 214 and second power rotor shaft 242, and GR is the gear ratio.

The inventors found that the example engines can vary control of exhaust Mach numbers as a function of the parameters defined in the examples of Table 1. The inventors developed a system effective control (SEC) for an engine expressed according to the relationship:

$$SEC = \left(\frac{4}{NBR}\right)\left[\left(\left(\frac{-120}{NBR}\right)\left(\frac{1}{GR}-1\right)^2\right)+3\left(\left(\frac{1}{GR^2}\right)-1\right)\right].$$

Again, the gear ratio (GR) is defined as a function of different rotation speeds of two or more of the power turbines within the number of blade rows (GR=abs(N1B/N1A), where N1B is the second speed of rotation of a second power turbine 214 (e.g., RPM), and NIA is the first speed of rotation of a first power turbine 212 (e.g., RPM)). Based on the SEC, some of the examples exhibit a relatively high heat transfer to the heat exchangers and achieve the operational efficiency while remaining within current engine constraints.

Based on the determined system effective control as a function of the number of blade rows and gear ratio of the examples of Table 1, it was determined that turbine engine designs with system effective control (SEC) in the range of 0.2 and 0.5 (i.e., 0.2<SEC<0.5) advantageously control the exhaust gas stream to achieve reduced exhaust Mach numbers that significantly improve heat exchanger efficiency. Some benefits are realized when the first power turbine 212 and second power turbine 214 are implemented with the relationship between the gear ratio and the number of blade rows achieve a system effective control (SEC) between 0.32 and 0.43 (i.e., 0.32<SEC<0.43). Table 2 identifies those examples of Table 1 that are valid and those that fail to achieve the intended SEC range.

TABLE 2

| EX.# | NBR | HSSC | LSSC | N1A | N1B | GR | SEC | Invalid |
|------|-----|------|------|------|------|------|------|---------|
| 1 | 3 | 2 | 1 | 11100 | −10767 | 0.97 | 0.2002 | |
| 2 | 3 | 2 | 1 | 22150 | −20378 | 0.92 | 0.3226 | |
| 3 | 3 | 2 | 1 | −13247 | 11723.6 | 0.89 | 0.2065 | |
| 4 | 3 | 2 | 1 | −8500 | 7395 | 0.87 | 0.0939 | X |
| 5 | 5 | 4 | 1 | 6600 | −6593.4 | 1.00 | 0.0060 | X |
| 6 | 4 | 2 | 2 | −6600 | 6336 | 0.96 | 0.2031 | |
| 7 | 4 | 2 | 2 | 17204 | −15483.6 | 0.90 | 0.3333 | |
| 8 | 5 | 4 | 1 | −3300 | 2805 | 0.85 | 0.2180 | |
| 9 | 4 | 2 | 2 | 2800 | −2296 | 0.82 | 0.0161 | X |
| 10 | 6 | 4 | 2 | 13247 | −12452.2 | 0.94 | 0.2091 | |
| 11 | 7 | 6 | 1 | 8120 | −6902 | 0.85 | 0.3529 | |
| 12 | 7 | 4 | 3 | 13247 | −10332.7 | 0.78 | 0.2266 | |
| 13 | 6 | 4 | 2 | −8120 | 6008.8 | 0.74 | 0.0063 | X |
| 14 | 8 | 6 | 2 | 7500 | −6675 | 0.89 | 0.2115 | |
| 15 | 12 | 8 | 4 | 7500 | −5325 | 0.71 | 0.4276 | |
| 16 | 12 | 6 | 6 | −7000 | 6650 | 0.95 | 0.0988 | X |
| 17 | 16 | 8 | 8 | 8800 | −7568 | 0.86 | 0.2144 | |
| 18 | 16 | 10 | 6 | 6700 | −4020 | 0.60 | 0.5000 | |
| 19 | 16 | 8 | 8 | −8800 | 7920 | 0.90 | 0.1528 | X |

In Table 2, EX #identifies the example number, NBR is the number of blade rows of the power turbine stage 210 comprising the combination of rotating blades and stator vanes, HSSC is the High Speed Stage Blade Row Count of the first power turbine 212 comprising one or more rotating blades and one or more stator vanes, LSSC is the Low Speed Stage Blade Row Count of the second power turbine 214 comprising one or more rotating blades and when relevant one or more stator vanes, NIA is the first speed of rotation of the first power turbine 212 and first power rotor shaft 240, N1B is the second speed of rotation of the second power turbine 214 and second power rotor shaft 242, GR is the gear ratio, the SEC is the corresponding system effectiveness control, and "Invalid" identifies those examples that are outside of the SEC range 0.2<SEC<0.5 that advantageously provides an engine with the intended operation and achieves the exhaust gas stream to achieve reduced exhaust Mach numbers that significantly improve heat exchanger efficiency.

Table 3 illustrates examples of minimum and maximum representations of the blade rows, and gear ratio (GR) in accordance with some embodiments.

TABLE 3

|  | NBR | HSSC | LSSC | GR |
|---|---|---|---|---|
| MIN | 3 | 2 | 1 | 0.6 |
| MAX | 16 | 10 | 8 | 0.97 |

Figure 11:
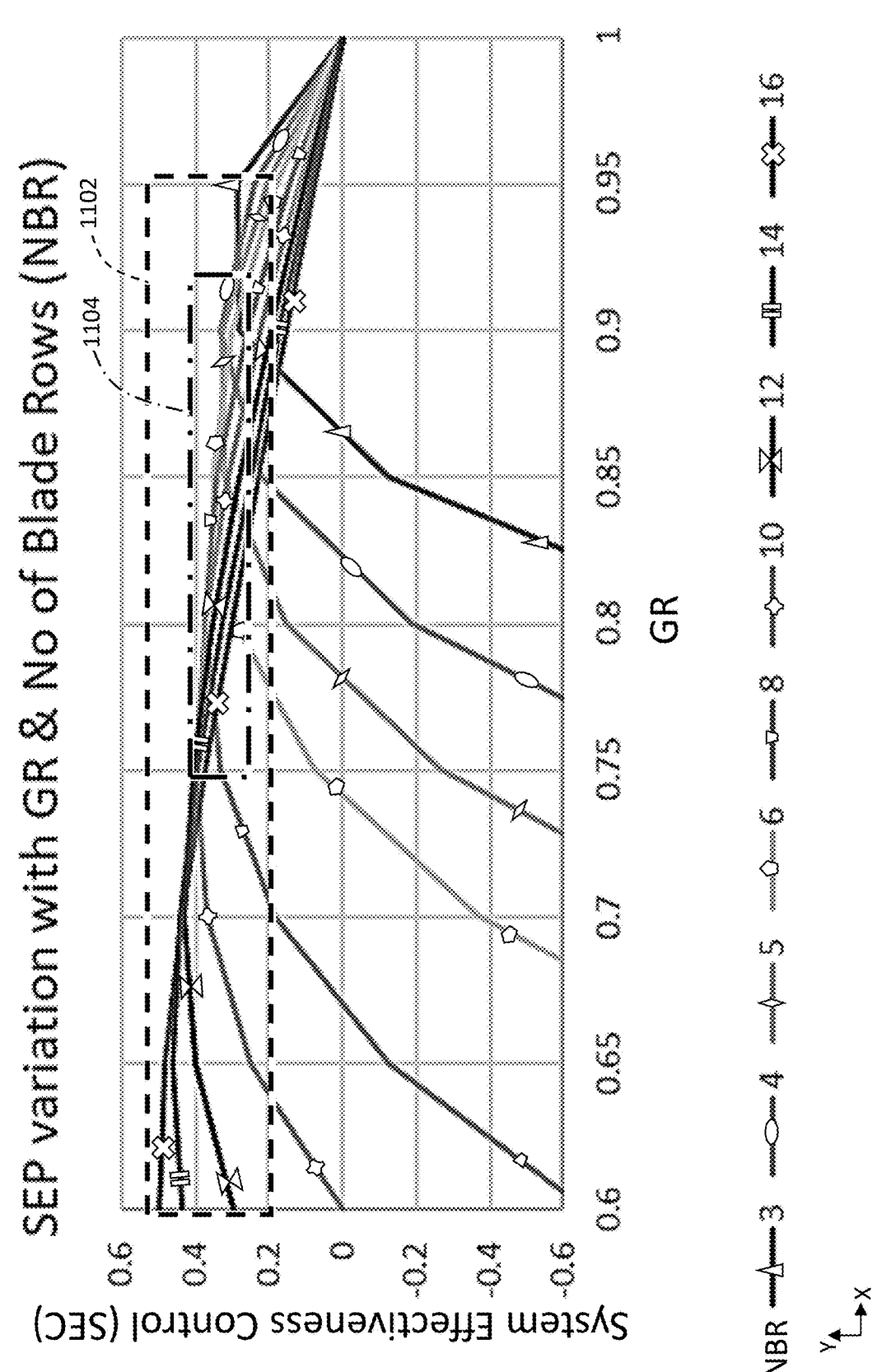
FIG. 11 illustrates an example process of operating a propulsion system, in accordance with some embodiments.

FIG. 11 illustrates a graphical representation of SEC variations relative to different gear ratios and different numbers of blade rows (NBR), in accordance with some embodiments. For example, the graph shows the SEC on the Y-axis and the GR on the X-axis. The graph shows examples of NBRs of 3, 4, 5, 6, 8, 10, 12, 14 and 16 of the first and second power turbines 212, 214. The first power turbine 212 typically comprises 1-7 stages providing 2-14 blade rows (rotation and stator rows), and the second power turbine typically comprises 1-4 stages providing 1-8 blade with at least one rotation row, where LSSC can be even or odd. The annulus of the blades of one or more blade rows of the first power turbine 212 are typically dictated by the expected first rotation speed and the material capabilities of the respective blades. The annulus of the blades of the rotating blade row of the second power turbine 214 is typically similarly dictated by the expected slower second rotation speed and the material capabilities. The utilization of the second power turbine 214 operating at the reduced rotation speed enables the airfoil height of the blades of the second power turbine 214 to be taller than the blades of the turbines of the first power turbine 212, which provides a greater annulus area, and thus the exhaust velocity of the exhaust gas stream 218 is reduced.

Some embodiments of the power turbine stage 210 balance how large the airfoils of the second power turbine can be opened, with a greater gear ratio (GR) generally corresponding to relatively slower second rotation speed of the second power turbine, allowing the annulus of the airfoils of the second power turbine to be opened more, while typically limiting an outer wall slope that can be utilized. Further, some embodiments utilize a greater opened annulus area of a low turning midframe (e.g., midframe stator blade row 306*c*) that is upstream of, or immediately upstream of the second power turbine 214, while limiting a length of the power turbine stage 210, and thus the engine. In some embodiments, the above factors are balanced to achieve a desired exhaust Mach number while limiting a length of the power turbine stage. It has been found that these factors can be balanced when the system effectiveness control (SEC) is greater than or equal to 0.2 and less than or equal to 0.5 (indicated by dashed box 1102 in FIG. 11), while in some embodiments, enhanced optimization is achieved when the SEC is greater than or equal to 0.32 and less than or equal to 0.43 (indicated by dashed box 1104 in FIG. 11). As illustrated in FIG. 11, smaller number of stages results in a more rapid effect (e.g., those graphic representations on the right hand side of the graph of FIG. 11), while larger engines with larger numbers of stages of the power turbine stage 210 provides more muted effects and a larger change in the gear ratio is utilized to achieve similar effects (e.g., those graphic representations on the left side of the graph of FIG. 11). The gear ratio (GR), defined as a function of the ratio of the second speed of rotation of the second power turbine 214 to the first speed of rotation of the first power turbine 212, can be set to be 0.6<GR<0.97, while in some implementations the gear ratio (GR) is established to be 0.78<GR<0.92.

Figure 12:
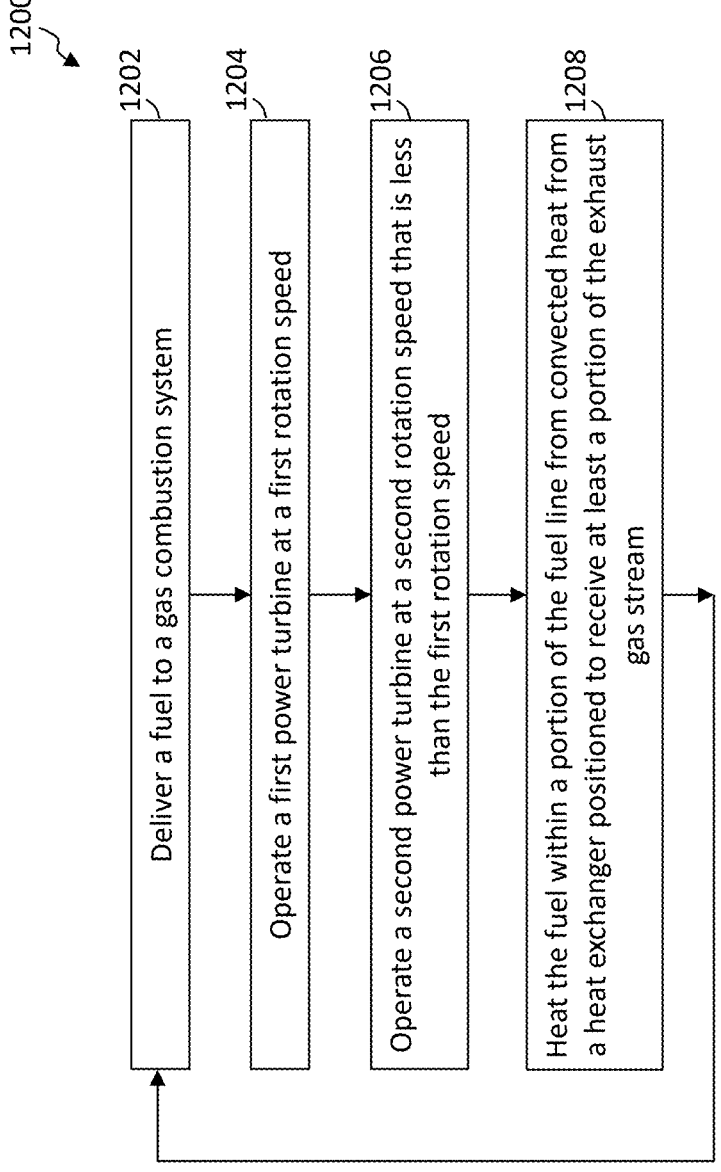
FIG. 12 illustrates a graphical representation of SEC variations relative to different gear ratios and different numbers of blade rows (NBR), in accordance with some embodiments.

FIG. 12 illustrates an example process 1200 of operating a propulsion system, in accordance with some embodiments. In step 1202, a fuel is delivered to a gas combustion system 58 of an engine. The fuel, in some embodiments, is a cryogenic fuel. The gas combustion system 58 is configured to ignite selected volumes of the fuel conveyed by a fuel line 222. In step 1204, a first power turbine 212 is operated at a first rotation speed. In some embodiments, the first power turbine 212 is positioned downstream of the gas combustion system 58 and at least partially positioned within an exhaust gas stream 218 downstream of the gas combustion system.

In step 1206, a second power turbine 214 is operated at a second rotation speed that is less than the first rotation speed. The second power turbine is at least partially positioned within the exhaust gas stream 218 downstream from the first power turbine 212. In some embodiments, the second power turbine 214 is configured to operate at the second rotation speed that is less than the first rotation speed that establishes a gear ratio (GR) defined by a ratio of the second rotation speed to the first rotation speed. The gear ratio, in part, enables a control of an exhaust Mach number of the exhaust gas stream 218 as the exhaust gas stream exits the second power turbine 214 and as it moves to contact one or more heat exchangers 220. In step 1208, the fuel is heated within a portion of the fuel line 222 from convected heat from the one or more heat exchangers 220 positioned to receive at least a portion of the exhaust gas stream 218 downstream of and after the second power turbine 214 in the direction of the exhaust gas flow through an exhaust system. Further, in some embodiments, a combination of the first power turbine 212 and the second power turbine 214 comprise a number of blade rows (NBR), wherein the first power turbine and the second power turbine are operated to establish at least:

$$0.2 < \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right] < 0.5.$$

The process 1200 can be repeated one or more times while the engine is operated. This provides a continued stream of heated fuel to the combustion system that is heated through the transfer of heat to the heat exchanger and subsequently to the fuel through one or more portions of fuel line. The heating is used, in some embodiments, with a cryogenic fuel resulting in a vaporization of the fuel as a function of the system effectiveness control (SEC).

Some embodiments provide heating and/or vaporization of fuels, such as cryogenic fuel gas to be used in a turbine engine systems that is injected into a combustion system. Heat is captured from exhaust gas to heat the fuel prior to injection, via a heat exchanger in the exhaust gas stream. Efficient heat exchangers often use high surface area for heat transfer, which can result in large assemblies that create high blockage in the turbine exhaust stream. Further, with other previous engines, such as some previous turboprop engine power turbine, the exhaust is often at Mach numbers of 0.35-0.45 or more, which often are due to mechanical constraints on the airfoils. These exhaust Mach numbers typically would result in high losses in the heat exchanger. Some current embodiments, however, incorporate a second power turbine stage that is implemented as a counter-rotating (CR) second power turbine stage and/or a slower rotating second power turbine stage. The counter-rotating and/or slower rotating second power turbine stage, in some embodiments, controls the power turbine exhaust Mach number to be between approximately 0.2 and 0.25 (0.2<EMN<0.25), which significantly improves heat exchange efficiency.

Achieving a lower exhaust Mach number from expansion of the exhaust gas through a low-speed and/or counter-rotating power turbine stage also allows for a compact bend collector (e.g., a compact 180-degree bend collector, 160-degree bend collection, 120-degree bend collector and/or other such bend collectors) in the exhaust path prior to the one or more heat exchangers 220. As described above, some embodiments provide a turboprop engine with a second power turbine stage that is operated at a reduced speed and/or in reverse count-rotation. The exhaust gas stream aft of the second power turbine 214 can, in some embodiments, be turned aft in a bend collector before being passed around and/or through the one or more heat exchangers 220, which can be located close to the combustion system for improved packaging, and can reduce gas fuel piping, with no heat transfer bus needed. Accordingly, some embodiments provide compact cryogenic fuel turbine engine packages that enable direct use of engine exhaust heat in vaporization of fuel rather than requiring a separate system (e.g., electrical, heat transfer bus, etc.).

Some previous land based power generation systems may use a long diffusing channel to reduce the inlet Mach number. Such long diffusing channels cannot be effectively utilized in many engines, such as many aviation engines. Current embodiments, however, avoid the use of long diffusing channels and utilize a low-speed turbine stage, which can collect power from the expansion process and reduce overall engine length. As described above, cryogenic fuel systems (like $H_2$) typically require a heat source for vaporization of the fuel. However, typical power turbines have high rotational speed (for efficiency) and the annulus height is limited due to mechanical limitations on the blade, which can result in high exhaust Mach numbers that are difficult to exchange heat with (loss=$f(M^2)$. It has been found that reducing the exhaust Mach from 0.4 to 0.25 reduces the loss by as much as 250% or more. Accordingly, some present embodiments incorporate a separate, low-speed downstream power turbine that effectively expands the exhaust gas to a lower Mach number. With lower exhaust Mach numbers, an efficient and compact bend collector can be integrated with the power turbine to reverse the flow direction of the exhaust gas stream and allow one or more heat exchangers to be located at the side of the engine, improving packaging and reducing overall installation length. The positioning of the heat exchanger along the sides of the rotor core enables the one or more fuel lines to be routed to enable vaporization to occur adjacent to the combustion system, which can reduce or minimize vapor transfer piping.

Controlled exhaust expansion within an engine is provided through design of the gear ratio (GR) between the low speed second power rotor shaft 242 and the high speed first power rotor shaft 240 (GR=abs(N1B/N1A), where N1B=low-speed second power rotor shaft rotating speed (e.g., RPM), and N1A=high-speed first power rotor shaft 240 rotating speed (e.g., RPM)). The utilization of the lower speed second power turbine 214, which is positioned downstream of the first power turbine 212, enables in part a reduction in the exhaust gas Mach number at the heat exchanger inlets, which reduces overall system loss according to $$0.2 < \left(\frac{4}{NBR}\right)\left[\left(\left(\frac{-120}{NBR}\right)\left(\frac{1}{GR}-1\right)^2\right)+3\left(\left(\frac{1}{GR^2}\right)-1\right)\right] < 0.5.$$

It has been identified that in some embodiments, the system operates better, including achieving better heat exchange, as the Mach number is reduced within a threshold range, at a rate of a square of the Mach number at an exit of the second power turbine. A loss coefficient through a heat exchange and/or a 180-degree bend collector is a function of the Mach number squared (the constant establishes common units). It has further been identified that outer wall slope through a midframe of one or both of the first power turbine and/or the second power turbine can increases turbine loss, for example $$loss = \left(\frac{const}{NBR^2}\right)*\left(\left(\frac{1}{GR}\right)-1\right)^2,$$

where NBR is a number of blade rows), which can convert the loss from the single row to an overall turbine effect. These two sets of factors can relate the individual component performance into a system parameter, since one is static loss and one is rotating performance (using current specific fuel consumption (SFC) derivatives to convert). Accordingly, it has been determined that these representative equations for these two effects are used and combined into a system effectiveness control (SEC) that shows an improved, and in some implementations, an optimal configuration for a range of turbine sizes and gear ratios, according to:

$$SEC = \left(\frac{4}{NBR}\right)\left[\left(\left(\frac{-120}{NBR}\right)\left(\frac{1}{GR}-1\right)^2\right)+3\left(\left(\frac{1}{GR^2}\right)-1\right)\right].$$

Some embodiments provide engines comprising: a fuel line; a gas combustion system configured to ignite selected volumes of fuel conveyed by the fuel line; a first power turbine downstream of the gas combustion system and at least partially positioned within an exhaust gas stream downstream of the gas combustion system, and wherein the first power turbine is configured to operate at a first rotation speed; a second power turbine at least partially positioned within the exhaust gas stream downstream from the first power turbine, wherein the second power turbine is configured to operate at a second rotation speed that is less than the first rotation speed; and a heat exchanger configured to receive at least a portion of the exhaust gas stream downstream of the second power turbine along an exhaust gas path, wherein a portion of the fuel line is positioned to receive heat from the heat exchanger configured to heat the fuel; and wherein a gear ratio (GR) is defined by a ratio of the second rotation speed to the first rotation speed, and wherein a combination of the first power turbine and the second power turbine includes a number of blade rows (NBR), wherein $$0.2 < \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right] < 0.5.$$

In some embodiments, the first power turbine is configured to rotate in a first rotational direction, and the second power turbine comprises a counter-rotating (CR) power turbine that rotates in a second rotational direction that is opposite to the first rotational direction. The system effectiveness control (SEC), in some implementations is defined by:

$$SEC = \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right];$$

wherein 0.32<SEC<0.43.

The engine can be implemented with the portion of the fuel line positioned adjacent to, within a threshold distance of and/or within the heat exchanger positioned prior to injection into the gas combustion system such that the heat received from the heat exchanger induces a vaporization of the fuel. The fuel can comprise a cryogenic fuel. The second power turbine, in some implementations, can be directly adjacent to the first power turbine without a vane structure between the first power turbine and the second power turbine. In some embodiments, at least the second power turbine causes a reduction in an exhaust Mach number (EMN) of the exhaust gas stream, following the second power turbine, such that the exhaust Mach number is less than or equal to 0.25 upon existing the second power turbine and/or at the heat exchanger. Further, the second power turbine, as a function of the gear ratio (GR), achieves the reduction in the exhaust Mach number (EMN) upon existing the second power turbine and/or at the heat exchanger to 0.2<EMN<0.25. As such, in some embodiments the second power turbine is controlled to implement the gear ratio (GR) and produce the exhaust Mach number (EMN), at the heat exchanger, of 0.2<EMN<0.25.

An engine, in some embodiments comprises: an exhaust system fluidly cooperated downstream of the second power turbine and comprising an exhaust path configured to direct the exhaust gas stream away from the second power turbine, and the exhaust path further comprises a bend collector positioned prior, in the exhaust path, to the heat exchanger. The first power turbine is secured and rotates about the engine centerline (e.g., engine rotational central axis) and has a first radius; the second power turbine is secured and rotates about the engine centerline and has a second radius; wherein a first portion of the exhaust path, downstream of the bend collector, extends generally parallel with the engine centerline at a first radial distance from the engine centerline that is greater than the first radius and greater than the second radius, and wherein the heat exchanger is cooperated with the first portion of the exhaust path. The heat exchanger can be at least partially positioned within the first portion of the exhaust path to receive the exhaust gas stream. In some embodiments, the gear ratio (GR) is established to be greater than or equal to 0.6 and less than or equal to 0.95

(0.6<GR<0.95). In some embodiments, the gear ratio (GR) is between 0.78 and 0.92, or in some implementations 0.78<GR<0.92.

The first power turbine, in some embodiments, comprises a high speed power turbine stage comprising between two and eight blade rows (e.g., 2 rows 8). The second power turbine, in some embodiments, comprises a low speed power turbine stage comprising between one and four blade rows (e.g., 1 rows 4). The engine can further comprise a first shaft, wherein the first power turbine is secured with the first shaft; a second shaft, wherein the second power turbine is secured with the second shaft; a gear box mechanically cooperated with both the first shaft and the second shaft; and a propeller mechanically cooperated with and rotationally driven by the gear box as a function of rotation of both the first shaft and the second shaft. In some embodiments, the engine can comprise: a first shaft, wherein the first power turbine is secured with the first shaft; a second shaft, wherein the second power turbine is secured with the second shaft; a gear box mechanically cooperated with the first shaft; a propeller mechanically cooperated with and rotationally driven by the gear box as a function of a rotation of the first shaft; and a generator mechanically cooperated with and rotationally driven by the second shaft.

Some embodiments provide methods of operating a propulsion system, comprising: delivering a fuel to a gas combustion system, of an engine, configured to ignite selected volumes of the fuel conveyed by a fuel line; operating a first power turbine at a first rotation speed, wherein the first power turbine is positioned downstream of the gas combustion system and at least partially positioned within an exhaust gas stream downstream of the gas combustion system; operating a second power turbine at a second rotation speed that is less than the first rotation speed, wherein the second power turbine is at least partially positioned within the exhaust gas stream downstream from the first power turbine, wherein the second power turbine is configured to operate at a second rotation speed that is less than the first rotation speed that establishes a gear ratio (GR) defined by a ratio of the second rotation speed to the first rotation speed; and heating the fuel within a portion of the fuel line from convected heat from a heat exchanger positioned to receive at least a portion of the exhaust gas stream downstream of the second power turbine; wherein a combination of the first power turbine and the second power turbine includes a number of blade rows (NBR); and wherein $$0.2 < \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right] < 0.5.$$

Those skilled in the art will recognize that a wide variety of other modifications, alterations, and combinations can also be made with respect to the above described embodiments without departing from the scope of the present disclosure, and that such modifications, alterations, and combinations are to be viewed as being within the ambit of the inventive concept.

What is claimed is:

1. An engine comprising:

a fuel line;

a gas combustion system;

a first power turbine downstream of the gas combustion system and at least partially positioned within an exhaust gas stream downstream of the gas combustion system, and wherein the first power turbine is configured to operate at a first rotation speed;

a second power turbine at least partially positioned within the exhaust gas stream downstream from the first power turbine, wherein the second power turbine is configured to operate at a second rotation speed that is less than the first rotation speed; and a heat exchanger configured to receive the exhaust gas stream downstream of the second power turbine, wherein a portion of the fuel line is positioned so that fuel receives heat from the heat exchanger; and wherein a gear ratio (GR) is defined by a ratio of the second rotation speed to the first rotation speed, wherein a combination of the first power turbine and the second power turbine includes a number of blade rows (NBR), and wherein NBR and GR fit a system effective control (SEC) relationship defined as:

$$SEC = \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right],$$

where $0.2 < SEC < 0.5$.

2. The engine of claim 1, wherein the first power turbine is configured to rotate in a first rotational direction; and wherein the second power turbine comprises a counter-rotating (CR) power turbine that rotates in a second rotational direction that is opposite to the first rotational direction.

3. The engine of claim 2, wherein the second power turbine is adjacent to the first power turbine without a vane structure between the first power turbine and the second power turbine.

4. The engine of claim 1, wherein $0.32 < SEC < 0.43$.

5. The engine of claim 1, wherein the portion of the fuel line positioned along the heat exchanger is positioned prior to fuel injection into the gas combustion system such that the heat received from the heat exchanger induces a vaporization of the fuel.

6. The engine of claim 5, wherein the fuel comprises a cryogenic fuel.

7. The engine of claim 1, wherein at least the second power turbine causes a reduction in an exhaust Mach number (EMN) of the exhaust gas stream, following the second power turbine, such that the exhaust Mach number is less than or equal to 0.25 at the heat exchanger.

8. The engine of claim 7, wherein the second power turbine is controlled to implement the gear ratio (GR) and produce the exhaust Mach number (EMN), at the heat exchanger, of $0.2 < EMN < 0.25$.

9. The engine of claim 1, further comprising:

an exhaust system coupled downstream of the second power turbine and defining an exhaust path configured to direct the exhaust gas stream away from the second power turbine, and the exhaust path further comprises a bend collector positioned prior, in the exhaust path, to the heat exchanger.

10. The engine of claim 9, wherein the first power turbine is secured and rotates about an engine centerline and has a first radius;

the second power turbine is secured and rotates about the engine centerline and has a second radius;

wherein a first portion of the exhaust path, downstream of the bend collector, extends generally parallel with the engine centerline at a first radial distance from the engine centerline that is greater than the first radius and greater than the second radius, and wherein the heat exchanger is operatively coupled with the first portion of the exhaust path.

11. The engine of claim 10, wherein the heat exchanger is at least partially positioned within the first portion of the exhaust path to receive the exhaust gas stream.

12. The engine of claim 1, wherein the gear ratio (GR) is $0.6 < GR < 0.97$.

13. The engine of claim 1, wherein the gear ratio (GR) is $0.78 < GR < 0.92$.

14. The engine of claim 1, further comprising:

the first power turbine comprising a high speed power turbine stage comprising between two and eight blade rows.

15. The engine of claim 14, further comprising:

the second power turbine comprising a low speed power turbine stage comprising between one and four blade rows.

16. The engine of claim 1, further comprising:

a first shaft, wherein the first power turbine is secured with the first shaft;

a second shaft, wherein the second power turbine is secured with the second shaft;

a gear box mechanically cooperated with both the first shaft and the second shaft; and a propeller mechanically cooperated with and rotationally driven by the gear box as a function of rotation of both the first shaft and the second shaft.

17. The engine of claim 1, further comprising:

a first shaft, wherein the first power turbine is secured with the first shaft;

a second shaft, wherein the second power turbine is secured with the second shaft;

a gear box mechanically cooperated with the first shaft;

a propeller mechanically cooperated with and rotationally driven by the gear box as a function of a rotation of the first shaft; and a generator mechanically cooperated with and rotationally driven by the second shaft.

18. A method of operating a propulsion system, comprising:

delivering a fuel to a gas combustion system of an engine;

operating a first power turbine at a first rotation speed, wherein the first power turbine is positioned downstream of the gas combustion system and at least partially positioned within an exhaust gas stream downstream of the gas combustion system;

operating a second power turbine at a second rotation speed that is less than the first rotation speed, wherein the second power turbine is at least partially positioned within the exhaust gas stream downstream from the first power turbine, wherein the second rotation speed establishes a gear ratio (GR) defined by a ratio of the second rotation speed to the first rotation speed; and heating the fuel within a portion of the fuel line from convected heat from a heat exchanger positioned to receive at least a portion of the exhaust gas stream downstream of the second power turbine;

wherein a combination of the first power turbine and the second power turbine includes a number of blade rows (NBR); and wherein NBR and GR fit a system effective control (SEC) relationship defined as $$SEC = \left(\frac{4}{NBR}\right)\left[\left(\left(\frac{-120}{NBR}\right)\left(\frac{1}{GR}-1\right)^2\right) + 3\left(\left(\frac{1}{GR^2}\right)-1\right)\right]$$

where $0.2 < SEC < 0.5$.

19. The method of claim 18, wherein the operating the first power turbine at the first rotation speed further comprises rotating the first power turbine in a first rotational direction; and wherein the operating the second power turbine at the second rotation speed further comprises rotating the second power turbine in a second rotational direction that is opposite to the first rotational direction.

20. The method of claim 18, wherein $0.32 < SEC < 0.43$.

\* \* \* \* \*